(12) United States Patent
Horowitz et al.

(10) Patent No.: US 11,389,834 B2
(45) Date of Patent: *Jul. 19, 2022

(54) SYSTEMS AND METHODS FOR SORTING RECYCLABLE ITEMS AND OTHER MATERIALS

(71) Applicant: AMP Robotics Corporation, Louisville, CO (US)

(72) Inventors: Matanya B. Horowitz, Golden, CO (US); James A. Bailey, Boulder, CO (US); John C. McCoy, Jr., Thornton, CO (US)

(73) Assignee: AMP Robotics Corporation, Louisville, CO (US)

( * ) Notice: Subject to any disclaimer, the term of this patent is extended or adjusted under 35 U.S.C. 154(b) by 12 days.

This patent is subject to a terminal disclaimer.

(21) Appl. No.: 17/062,383

(22) Filed: Oct. 2, 2020

(65) Prior Publication Data

US 2021/0094075 A1 Apr. 1, 2021

Related U.S. Application Data

(63) Continuation of application No. 16/047,256, filed on Jul. 27, 2018, now Pat. No. 10,799,915.

(Continued)

(51) Int. Cl.
*B07C 5/36* (2006.01)
*B07C 5/342* (2006.01)
(Continued)

(52) U.S. Cl.
CPC .............. *B07C 5/3422* (2013.01); *B07C 1/04* (2013.01); *B07C 5/36* (2013.01); *B07C 5/367* (2013.01);
(Continued)

(58) Field of Classification Search
CPC ......... B07C 1/04; B07C 5/3422; B07C 5/361; B07C 5/362; B07C 5/367; B07C 5/368; B07C 5/38; B07C 2501/0054
See application file for complete search history.

(56) References Cited

U.S. PATENT DOCUMENTS 5,253,765 A 10/1993 Moorehead
6,124,560 A 9/2000 Roos
(Continued)

FOREIGN PATENT DOCUMENTS

EP 0824042 2/1998
WO 9819799 5/1998
(Continued)

OTHER PUBLICATIONS

CrowdFlower; "What We Learned Labeling 1 Million Images a practical guide to image annotation for Computervision"; pp. 1-15; Published by CrowdFlower.
(Continued)

*Primary Examiner* — Joseph C Rodriguez
(74) *Attorney, Agent, or Firm* — Van Pelt, Yi & James LLP

(57) ABSTRACT

Systems and methods for sorting recyclable items and other materials are provided. In one embodiment, a system for sorting objects comprises: at least one imaging sensor; a controller comprising a processor and memory storage, wherein the controller receives image data captured by the image sensor; and at least one pusher device coupled to the controller, wherein the at least one pusher device is configured to receive an actuation signal from the controller. The processor is configured to detect objects travelling on a conveyor device and recognize at least one target item traveling on a conveyor device by processing the image data and to determine an expected time when the at least one target item will be located within a diversion path of the (Continued)

pusher device. The controller selectively generates the actuation signal based on whether a sensed object detected in the image data comprise the at least one target item.

22 Claims, 13 Drawing Sheets

Related U.S. Application Data

(60) Provisional application No. 62/538,632, filed on Jul. 28, 2017.

(51) Int. Cl.
  *B07C 1/04* (2006.01)
  *G05B 13/02* (2006.01)

(52) U.S. Cl.
  CPC ............ *B07C 5/368* (2013.01); *G05B 13/027* (2013.01); *B07C 2501/0054* (2013.01)

(56) References Cited

U.S. PATENT DOCUMENTS

| | | | |
|---|---|---|---|
| 6,305,548 B1 | 10/2001 | Sato | |
| 6,545,240 B2 | 4/2003 | Kumar | |
| 6,732,897 B2 | 5/2004 | DeHart | |
| 7,558,370 B2 | 7/2009 | Sommer, Jr. | |
| 7,674,994 B1 | 3/2010 | Valerio | |
| 7,848,484 B2 | 12/2010 | Sommer, Jr. | |
| 7,863,536 B2 * | 1/2011 | Cerutti | B07C 3/02 209/583 |
| 8,615,123 B2 | 12/2013 | Dabic | |
| 8,809,718 B1 | 8/2014 | Doak | |
| 9,114,433 B2 | 8/2015 | Roos | |
| 9,405,992 B2 | 8/2016 | Bådholm | |
| 9,592,983 B2 * | 3/2017 | Costanzo | B65G 43/08 |
| 9,754,382 B1 | 9/2017 | Rodoni | |
| 9,884,346 B2 | 2/2018 | Bamber | |
| 10,198,653 B2 | 2/2019 | Kotula | |
| 10,207,296 B2 | 2/2019 | Garcia | |
| 10,625,304 B2 | 4/2020 | Kumar | |
| 10,710,119 B2 | 7/2020 | Kumar | |
| 10,722,922 B2 | 7/2020 | Kumar | |
| 10,799,915 B2 * | 10/2020 | Horowitz | C08G 61/126 |
| 2002/0179502 A1 * | 12/2002 | Cerutti | B65G 47/52 209/583 |
| 2003/0141165 A1 * | 7/2003 | Reznik | B65G 47/30 198/434 |
| 2004/0055250 A1 | 3/2004 | Main | |
| 2004/0247193 A1 | 12/2004 | Qualtrough | |
| 2006/0178774 A1 * | 8/2006 | Reznik | B07C 5/36 700/224 |
| 2007/0209906 A1 * | 9/2007 | Ranger | B65G 47/82 198/370.07 |
| 2007/0246328 A1 * | 10/2007 | Reznik | B65G 47/844 198/444 |
| 2007/0260466 A1 | 11/2007 | Casella | |
| 2011/0230699 A1 | 9/2011 | Reese | |
| 2016/0101957 A1 * | 4/2016 | Costanzo | B65G 47/44 198/358 |
| 2017/0174439 A1 | 6/2017 | Ripley | |
| 2017/0225199 A1 | 8/2017 | Koistinen | |
| 2017/0232479 A1 | 8/2017 | Pietzka | |
| 2017/0345169 A1 | 11/2017 | Rodoni | |
| 2018/0243800 A1 | 8/2018 | Kumar | |
| 2019/0091730 A1 | 3/2019 | Torang | |
| 2020/0290088 A1 | 9/2020 | Kumar | |
| 2020/0368786 A1 | 11/2020 | Kumar | |
| 2021/0094075 A1 * | 4/2021 | Horowitz | B07C 5/3422 |
| 2021/0229133 A1 | 7/2021 | Kumar | |
| 2021/0346916 A1 | 11/2021 | Kumar | |
| 2022/0016675 A1 | 1/2022 | Kumar | |
| 2022/0023918 A1 | 1/2022 | Kumar | |

FOREIGN PATENT DOCUMENTS

| | | |
|---|---|---|
| WO | 9819800 | 5/1998 |
| WO | 2017011835 | 1/2017 |
| WO | 2017106778 | 6/2017 |

OTHER PUBLICATIONS

Huang, Jonathan et al. "Speed/accuracy trade-offs for modern convolutional object detectors"; OPen Access version, provided by the Computer Vision Foundation; Published by IEEE Xplore; pp. 7310-7319; Nov. 30, 2016.

International Searching Authority, "International Search Report and Written Opinion from PCT Application No. PCT/US2018/044039 dated Feb. 5, 2019", pp. 1-20 published: WO.

International Searching Authority, "Invitation to Pay Additional Fees and, where Application, Protest Fee from International Application No. PCT/US2018/044039" dated Oct. 4, 2018, pp. 1 -13, Published in: WO.

Kingma et al., "Adam: A Method for Stochastic Optimization", 2015, pp. 1-15, ICLR.

Krizhezsky, Alex et al., "ImageNet Classification with Deep Convolutional Neural Networks," Dec. 3, 2012, pp. 1-9.

Lecun, Yann et al., "Gradient-Based Learning Applied to Document Recognition," Proc of the IEEE, Nov. 1998, pp. 1-46.

* cited by examiner

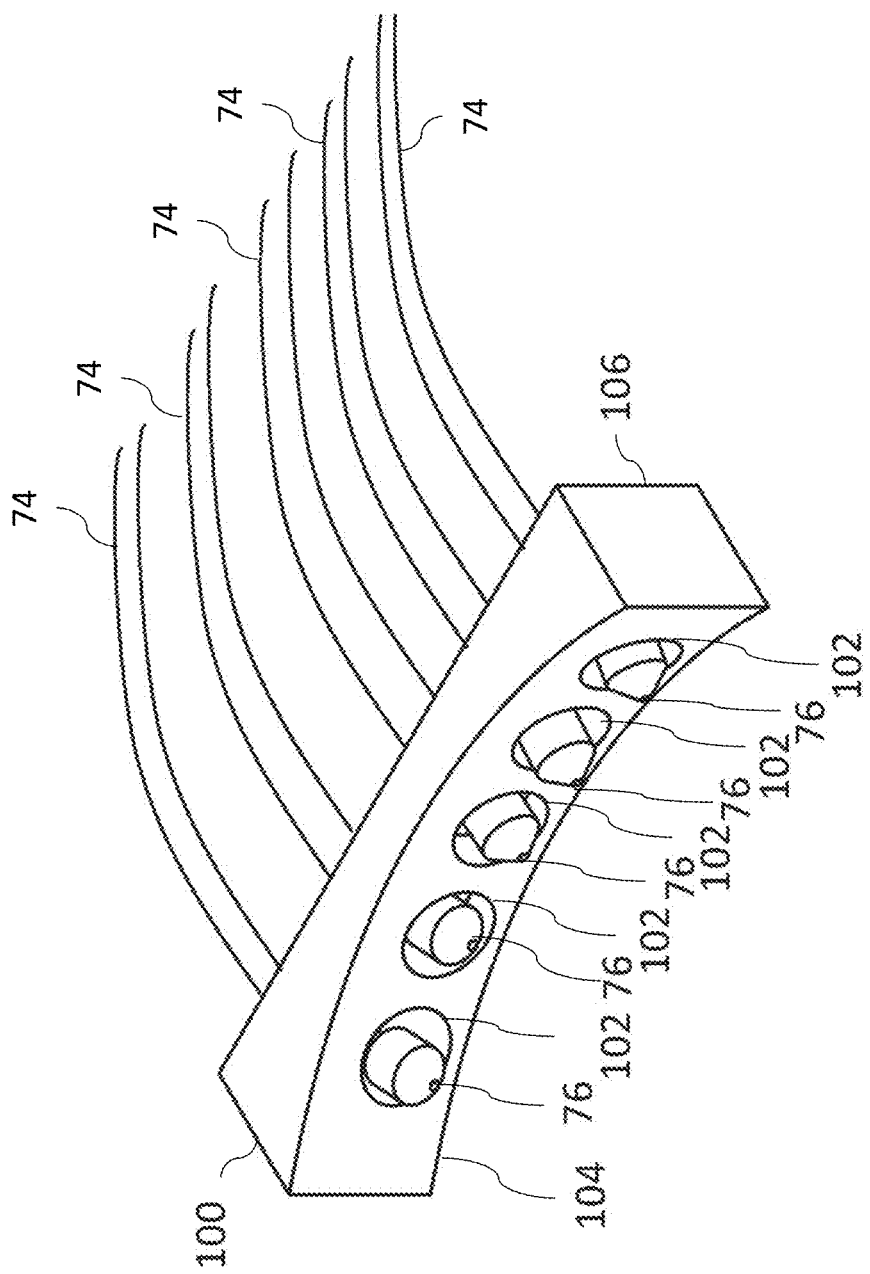

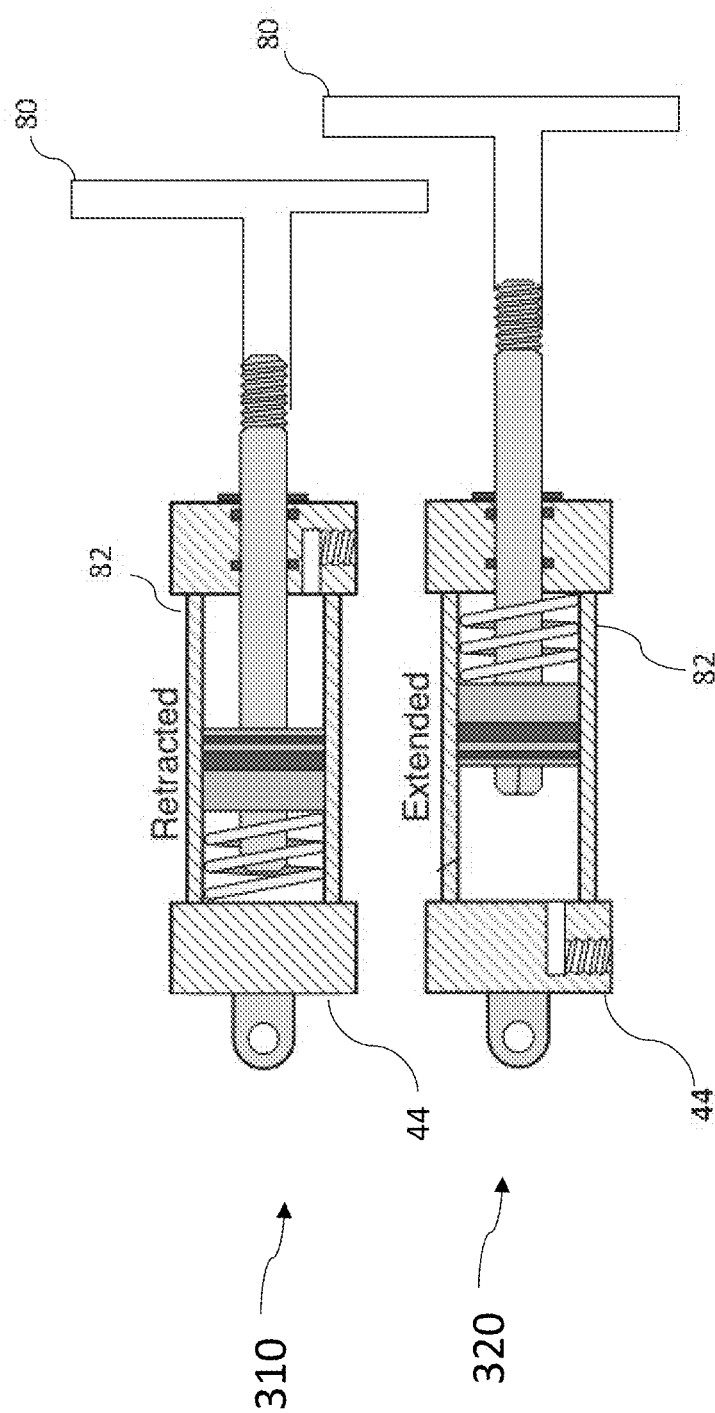

SYSTEMS AND METHODS FOR SORTING RECYCLABLE ITEMS AND OTHER MATERIALS

CROSS-REFERENCE TO RELATED APPLICATIONS

This Application is a continuation of U.S. patent application Ser. No. 16/047,256, entitled SYSTEMS AND METHODS FOR SORTING RECYCLABLE ITEMS AND OTHER MATERIALS, filed Jul. 27, 2018, which is a non-provisional U.S. Patent Application claiming priority to, and the benefit of, U.S. Provisional Patent Application No. 62/538,632, titled "Devices. Systems and Methods for Sorting/Re-directing Recyclable Items" filed on Jul. 28, 2017, each of which is incorporated herein by reference in its entirety.

GOVERNMENT LICENSE RIGHTS

This invention was made with government support under Contract No. 1556058 awarded by the National Science Foundation. The government has certain rights in the invention.

BACKGROUND

In many recycling centers that receive recyclable materials, sortation of materials may be done by hand or by machines. For example, a stream of materials may be carried by a conveyor device, such as a conveyor below, and the operator of the recycling center may need to direct a certain fraction of the material into a bin or otherwise off the current conveyer. These conventional sorting systems are large in size and lack flexibility due to their large size. Moreover, they lack the ability to be used in recycling facilities that handle various types of items such as plastic bottles, aluminum cans, cardboard cartons, and other recyclable items, or to be readily updated to handle new or different materials.

For the reasons stated above and for other reasons stated below which will become apparent to those skilled in the art upon reading and understanding the specification, there is a need in the art for systems and methods for sorting recyclable items and other materials.

SUMMARY

The Embodiments of the present disclosure provide systems and method for sorting recyclable items and other materials and will be understood by reading and studying the following specification.

In one embodiment, a system for sorting objects comprises: at least one imaging sensor; a controller comprising a processor and a memory storage, wherein the controller receives image data captured by the at least one image sensor; and at least one pusher device coupled to the controller, wherein the at least one pusher device is configured to receive an actuation signal from the controller. The processor executes an item identification module configured to detect objects travelling on a conveyor device and recognize at least one target item traveling on a conveyor device by processing the image data and to determine an expected time when the at least one target item will be located within a diversion path of the pusher device. And wherein the controller selectively generates the actuation signal based on whether a sensed object detected in the image data comprise the at least one target item.

DRAWINGS

Embodiments of the present disclosure can be more easily understood and further advantages and uses thereof more readily apparent, when considered in view of the description of the preferred embodiments and the following figures in which:

FIGS. 2, 2A and 2B, illustrate pushing mechanisms for a pusher device that comprises air jet pushing mechanism of one embodiment of the present disclosure;

FIG. 3 illustrates a mechanical pushing mechanism that comprises a retractable arm or paddle member coupled with a controllable pneumatic cylinder or linear actuator;

In accordance with common practice, the various described features are not drawn to scale but are drawn to emphasize features relevant to the present disclosure. Reference characters denote like elements throughout figures and text.

DETAILED DESCRIPTION

Figure 1:
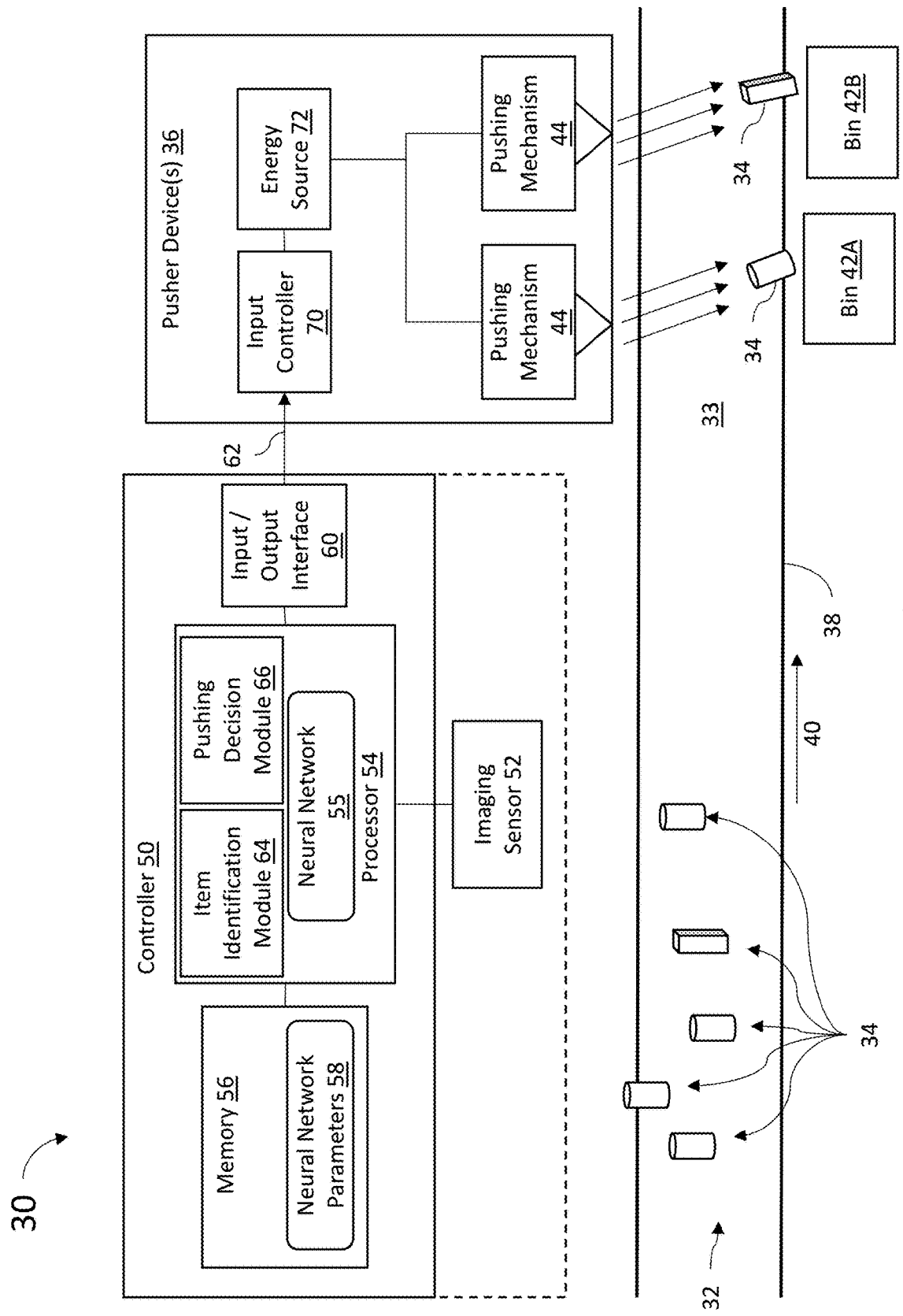
FIG. 1 is a block diagram illustrating a sorting system of one embodiment of the present disclosure.

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

As disclosed in detail herein, embodiments of the present disclosure provide for the identification of different materials in order to determine which materials should be diverted from a conveyor device. In some embodiments, machine learning techniques are utilized to train (i.e., configure) a neural network to identify a variety of different materials, identify which materials are categorized as recyclable, and further discriminate different recyclable materials from each other. Images are captured of objects traveling on a conveyor, and based on the identification of such materials, the systems described herein can decide which material should be allowed to remain on the conveyor, and which should be diverted/removed from the conveyor (for example, either into a collection bin, or diverted onto another conveyor). Diversion of materials selected to be diverted is performed by one or more pusher devices, as further described below. As such, a pusher device, as that term is used herein, may refer to any form of device which may be activated to dynamically displace an object on or from the conveyor, employing pneumatic, mechanical, or other means to do so. Some embodiments may comprise multiple pusher devices located at different locations and/or with different diversion path orientations along the path of the conveyor. In various different implementations, these sorting systems describe herein may determine which pusher device to activate (if any) depending on characteristics of objects identified by the neural network. Moreover, the determination of which pusher device to activate may be based on the detected presence and/or characteristics of other objects that may also be within the diversion path of a pusher device concurrently with a target item.

As discussed below, a neural network for an existing installation may be dynamically reconfigured to detect and recognize characteristics of new material by replacing a current set of neural network parameters with a new set of neural network parameters. Furthermore, even for facilities where singulation along the conveyor device is not perfect, the disclosed sorting systems disclosed below can recognize when multiple objects are not well singulated, and dynamically select from a plurality of pusher devices which should be activated based on which pusher device provides the best diversion path for potentially separating objects within close proximity. In some embodiments, objects identified as target objects may represent material that should be diverted off of the conveyor system. In other embodiments, objects identified as target objects represent material that should be allowed to remain on the conveyor system so that non-target materials are instead diverted.

FIGS. 1-13 illustrate various aspects of systems and methods for sorting/diverting targeted objects, such as but not limited to, recyclable items/objects/materials from a conveyor device, according to various embodiments of the present disclosure. One or more components of these embodiments may be used in conjunction with conventional conveyor lines in recycling facilities, plants, or other locations/environments where recycling items/objects/materials are processed. One or more of the components described herein may be used with, attached to, or retrofit onto conventional or existing conveyor device systems, or integrated into new facilities or new conveyor device systems, if desired, to provide a space-efficient and cost-effective sortation system.

FIG. 1 is a block diagram illustrating a sorting system 30 of one embodiment of the present disclosure. The system 30 receives numerous items/objects/materials 34, such as recyclable materials, from collection trucks or by other means, and those items 34 are placed on to a conveyor device or system 32, such as but not limited to a conveyor belt system. As shown in FIG. 1, sorting system 30 comprises an item identification system 50 that functions as a controller for recognizing characteristics associated with the items 34 and controlling the operation of one or more pusher devices 36. Item identification system 50, also referred to herein as controller 50, includes a processor 54 coupled to a memory 56 and may execute code or other algorithms to implements the functions of the controller 50 described herein. Sorting system 30 further include at least one imaging sensor 52 (for example, a camera or other image capturing device) which captures images of conveyor device 32 and the items 34 transported by conveyor device 32. The imaging sensor 52 may be an integrated component of the controller 50, but may also comprise a separate components externally coupled to the controller 50.

In the embodiment shown in FIG. 1, one or more of the pusher devices 36, described later herein, are provided. These pusher device 36 may be positioned along the sides 38 of a conveyor device 32, to selectively move or divert target items 34 off of the conveyor device 32. In one example, the pusher device(s) 36 can be configured to move or divert target items 34. In some instance, a particular pusher device 36 may move a target item 34 in a direction that is generally perpendicular to the travel/flow direction 40 of the conveyor device 32. However, other pusher devices 36 may move a target item 34 in a direction other than a direction perpendicular to the travel/flaw direction 40 of the conveyor device 32. Regardless, the target items 34, upon being diverted by a pusher device 36, can be collected in collection/sortation bins 42 (such as 42A, 42B) located off to the sides 38 of the conveyor belt 32, or diverted onto another conveyor device 32. As described herein, a series of pusher devices 36 (which may include one or more separate pushing mechanisms 44) can be positioned along the sides 38 of conveyor device 32 so that each pusher device 36 can be configured to redirect certain types of target items 34 (as identified by controller 50) which thereby permits the series of pusher devices 36 to divert various different target items 34 off of the conveyor device 32 and into different bins 42 along the sides 38 of the conveyor device 32, or to allow target items 34 to pass across conveyor device 32 while diverting non-target items from conveyor device 32.

In some embodiments, the controller 50, as explained in greater detail below, implements a computer learning based neural network 55 which identifies items 34 and recognizes certain ones of those items 34 as being target items based on characteristics that the neural network 55 detects in frames of images captured by imaging sensor 52. As shown in FIG. 1, the controller 50 and/or imaging sensor 52 may be positioned upstream or prior to the pusher devices 36 in one example. The controller 50 may examine an item 34 on the conveyor device 32 and determine the item type, such as whether the item is recyclable plastic (such as Nos. 1-7), aluminum, tin, glass, paper, cardboard, carton (drink carton, milk carton, fluid carton, juice carton, etc.), shredded electronic (such as aluminum, printed circuit board, or copper), or branded items (such as Starbucks coffee cups), for example.

In accordance with one example of the present disclosure, the imaging sensors 52 may be positioned adjacent or otherwise about the conveyor device 32 to take images or video of the items 34 as they travel on the conveyor device 32. The imaging sensor 52, in one example, may include a color video camera(s) that provides frames of digital color pixel data arranged in matrix over a communications interface such as Ethernet or USB, in one example. Alternatively, other examples would include infrared or x-ray area-scan or also line-scan cameras 52.

The processor 54, may comprise, for example, a computing device, microprocessor, microcontroller, digital signal processor (DSP), application specific integrated circuit (ASIC), graphics processing unit, or any combination thereof—which contains one or more operations, logic or computer programs for performing various operations and functions (such as but not limited to the operations and processes described herein) to identify objects 34 on the conveyor device 32 and control the processing of such items 34.

The processor 54 may be coupled with the imaging sensor 52 as an input to the processor 54, and the processor may use the image data received from the imaging sensor 52—along with other information—to determine whether an item 34 on the conveyor device 32 is to be diverted into another direction or off of the conveyor device 32 for instance into a collection bin 42.

The processor 54 may be coupled to, and receive data from, a memory 56 (which may be a local or remote storage device, database, memory or remote device) that stores parameters 58 (which may include neural network parameters as discussed below, and/or various other parameters) and other data relating to items 34. These parameters 58 can be used by the processor 54 to identify an item 34, whether it is a target item, and process it accordingly. As described below, the stored parameters 58 may also include the weights used to define the activation of a neuron in the neural network 55, or also a bias unit. Stored parameters 58 may also include parameters for pre-processing or post-processing the input or output of the neural network 55, such as brightness, hue shift, Gaussian blur, or other image transformation parameters. Parameters 58 may also include any data or information relating to items 34, characteristics of items 34, or properties relating to different types of items 34.

At an output of the processor 54, the controller 50 also includes an interface 60, such as an input/output (I/O) interface, for coupling an output signal(s) of the processor 54 with an input/control 70 of the pusher device 36, such that the controller 50 can communicate and control the pusher device 36 through the I/O interface 60. The interface 60 may be implemented using conventional I/O ports of the processor 54, with associated hardware drivers, signal conditioning circuits, or other glue logic or devices. The controller 50 may optionally include one or more wired or wireless network connections (not shown) to provide remote monitoring or remote control of the controller 50 and of the pusher devices 36 during use. The network connections may be implemented using conventional wired or wireless networking interfaces (e.g., Ethernet), protocols and messaging, in one embodiment.

In one example, the processor 54 determines for each item 34 on the conveyor device 32 characteristics such as the item type, the item size, the location of the item 34 on the conveyor device 32, and the timing to generate and send an output signal such as an actuation signal 62 to the pusher device 36 (which may be based on the conveyor speed and/or the speed at which the item 34 is moving, and/or the expected time when the item 34 will be at one or more of the pushing mechanisms 44). The processor 54 may also estimate or obtain an expected or typical weight of the item 34 which can be used to determine an amount of pushing force to use to push/re-direct the item/object/material 34 off to a side of the conveyor device 32.

In one example, the processor 54 may include or be coupled with one or more modules containing computer code, programmable logic or other hardware configured to process information about each item 34 on the conveyor device 32. In one example, an item identification module 64 may operate with or within the processor 54, wherein the item identification module 64 processes image(s) received from imaging sensors 52 of the item 34, and determines the type of item, the item size and location of the item 34 that is present on the conveyor device 32. In one example, the item identification module 64 may also estimate or obtain an expected or typical weight of the item 34. The item identification system 64 may include one or more of the operations, processors or features disclosed herein.

In one example, a pushing decision module 66 may operate with or within the processor 54 to determine, based in part on the identification of an item 34, whether an item 34 is to be diverted/pushed off of the conveyor device 32 or whether the item 34 is to be left to pass through undisturbed. The pushing decision module 66 may include one or more operations, processes or features disclosed herein.

The pushing decision module 66 may be dynamically configurable or programmable for use in a particular application or recycling site. The pushing decision module 66 can, in one example, receive input from a local or remote user or administrator as to which items 34 are to be targeted for pushing and collection in bins 42. These configurations can be dynamically changed or adjusted as desired for use in a particular recycling center or environment. For example, in one implementation, during a first shift from 8 am to 10 pm, the pushing decision module 66 can be configured to divert all tin cans 34 into a first collection bin 42A, and to divert all milk cartons 34 into a second collection bin 42B; and during a second shift from 10 pm to 8 am, the pushing decision module 66 can be configured to divert all aluminum cans 34 into a bin 42A, and to divert all plastic bottles 34 into another collection bin 42B. This dynamic re-configurability of the controller 50 provides enhanced flexibility, utilization and control of the pusher devices 36 and the system 30.

In one example, the pushing decision module 66 makes a determination whether to send a actuation signal (which may comprise a signal, a set of signals, or one or more messages) 62 to a pusher device 36 to divert an item 34. For instance, in the above example, upon the item identification module 64 identifying a tin can or a milk carton 34 on the conveyor device 32 as a target item, the pushing decision module 66 of the processor 54 issues a message or control signal 62 through the interface 60 to the pusher device 36 to divert the item 34. In one example, the pushing decision module 66 determines the content and nature of the signal(s) or message(s) sent to the pusher device 36, based on the target item type, size and location, conveyor speed, and information about other neighboring items located about the target item.

The actuation signal 62 sent by the controller 50 to the pusher device 36 may include information such as: an instruction that directs the pusher device 36 (one or one or more of its pushing mechanisms 44); a time duration and an intensity or force amount to apply by the pusher device 36 to the item 34, or other parameters for use by the pusher device 36. If there are multiple or different pushing mechanisms 44 included in the pusher device 36, the signals 62 may also include address information to indicate which pushing mechanism 44 to activate.

In one example of the present disclosure, a pusher device 36 may include an input controller 70, an energy source 72 (such as but not limited to compressed air source(s), electric motor(s), etc.), and one or more pushing mechanisms 44 that apply diverting force(s) to items 34 on the conveyor device 32.

As shown in FIG. 1, in some embodiments a pusher device 36 may comprises multiple separate and individually controllable pushing mechanisms 44. Such pushing mechanisms 44 can be positioned or attached along the sides 38 of the conveyor device 32 so that the pushing mechanisms 44 do not add length at the end of the conveyor device 32. In another embodiment of the present disclosure and as described below, one or more pushing mechanisms 44 can be positioned on or above the conveyor device 32, for instance, about the center of the conveyor device's moving surface 33.

As described above, a pusher device 36 may receive one or more actuation signals 62 from the controller 50, such actuation signals 62 directing the pusher device 36 to enable one or more of the pushing mechanisms 44. The signals 62 may also include a time duration and an intensity or force amount to apply by the pusher device 36 to the item 34, or other parameters for use by the pusher device 36. If there are multiple or different pushing mechanisms 44 included in a pusher device 36, the signal may also include address information to indicate which pushing mechanism 44 to activate.

The input controller 70 of the pusher device receives the signal(s) or message(s) 62 from the controller 50, and may include one or more switches (with associated logic or circuits) to control (i.e., enable/disable) the pushing mechanisms 44, for instance, through the selective activation or selective application/coupling of energy from the energy source(s) 72 to one or more of the pushing mechanisms 44.

Figure 2A:
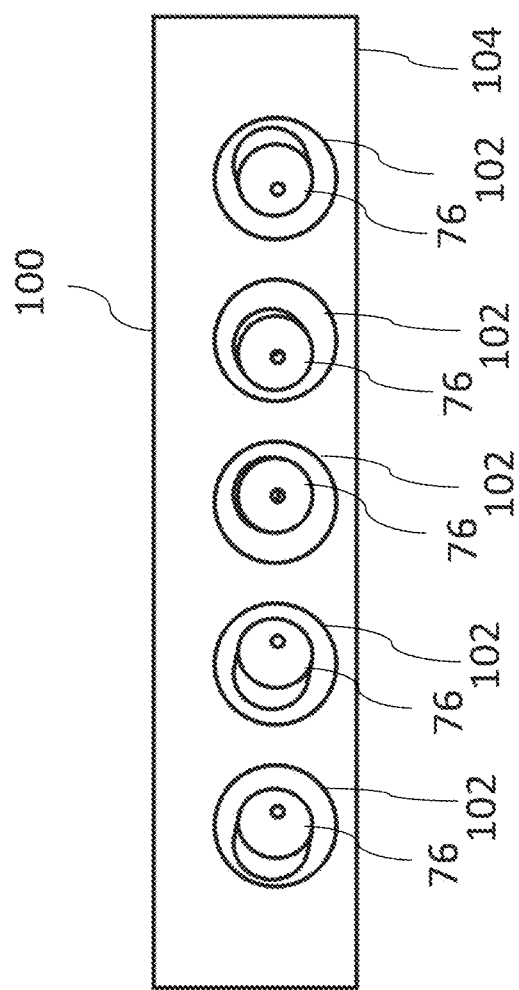
Figure 2B:
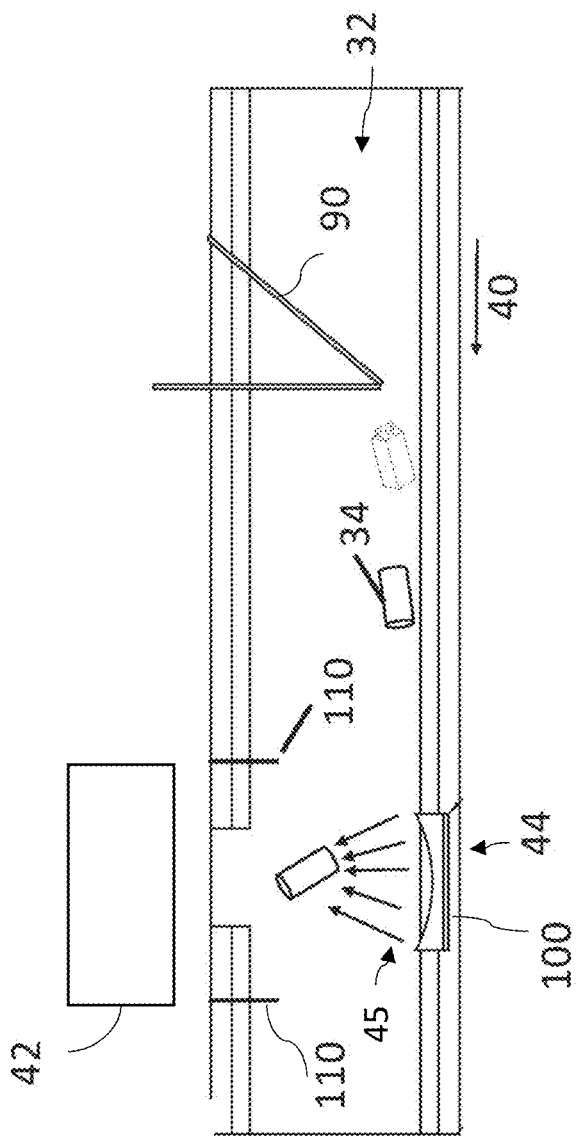

Pusher devices 36 and pushing mechanisms 44 that can be used in accordance with the present disclosure can take many forms. As illustrated in FIGS. 2, 2A and 2B, in some embodiments, a pusher device 36 may use as pushing mechanism 44 one or more air jets 76, where each of the respective air jets 76 may comprise a component of a separate pusher device 36, or may comprise an individual pushing mechanism 44 thereof, to re-direct targeted items 34 from the conveyor device 32. These figures illustrate one example of a configuration comprising of a series of air jets 76. In this example, the air jets 76 are arranged in a semi-circle on a base or frame 100, in order that each they direct air over different angles over the conveyor belt 32. Also in this example, five air jets 76 are supported by a frame 100. However, it should be understood that a fewer or greater number of air jets 76 may be provided by a single frame 100 if desired. One or more of these jets 76, such as a subset of jets, may be activated to selectively pick or re-direct target materials 34, for example. Alternatively, all of the jets 76 can be simultaneously activated for instance, depending on a target item's size, expected weight, location on the conveyor device 32, or other factors.

As shown in FIG. 2A, the frame 100 may have a plurality of openings/holes 102, each opening 102 adapted to receive, position and retain an air jet 76. In one example, the frame 100 may have a front surface 104 that defines a semi-circle or arc shape (such as a concave arc shape shown in FIG. 2)—so that when the air jets 76 are positioned within the frame 100, the air exiting each air jet 76 is directed in a desired direction and towards a desired location with respect to the conveyor device 32. The frame 100 secures each air jet 76 such that on the front side 104 of the frame 100, the exit end of each air jet 76 is positioned in a desired place relative to the conveyor device 32 surface while air tubing 74 (which may connected with an energy source 72 comprising an air compressor to provide compressed air to the air jets 76) extends from the rear side 106 of the frame 100 and connects with the energy source 72.

Other shapes of the frame 100 are possible so that the air jets 76 are in different arrangements—such as but not limited to linear, arcuate (i.e., defining a convex arc), and vertically stacked with two or more jets 76, or any combination thereof. For instance, a plurality of air jets 76 could be arranged in a base/frame 100 in i-row rectangle, square, triangle, or other arrangement.

When activated, in one example, the input controller 70 directs an energy source 72 to provide compressed air into the nozzle(s) 76 so that compressed air passes through and out of the nozzle(s) 76 and onto the target item(s) 34 on the conveyor device 32. In one example, the compressed air energy source 72 can be activated by the input controller 70 to be in shorts bursts, or of longer time durations, depending on the size and other characteristics (i.e., expected or typical item weight) of the target item 34 to be diverted. This can be controlled by the pushing decision module 66 of the controller 50, in one example. In one embodiment, a constant level of air pressure is delivered to the nozzles 76 from the compressed air source 72. In another example, the air pressure delivered to the nozzles 76 may vary and be controlled by the input controller 70. In another example, the compressed air source 72 provides a single air pressure, and one or more pressure regulators are used to create differing levels of air pressure which can be used by the pushing mechanism(s) 44. In another example as described below, two or more nozzles 76 may be used in a pushing mechanism 44, and each nozzle 76 can have an independently controllable compressed air supply line 74, so that if more air pressure/redirecting force is needed, the input controller 70 can enable/activate more air nozzles 76.

In one example, the positions of the air jets 76 of a pushing mechanism 44 (with the corresponding path of the exiting air of the air jets 76) relative to a conveyor device 32 are determined and may be used as parameters by the pushing decision module 66 in determining which pusher device 36 or pushing mechanism 44 to activate and when to activate it in order to divert a targeted item 34 on the conveyor device 32. The air nozzles 76 may also use the same or similar nozzle geometry to provide similar air pressure/redirecting force for a given input air pressure, or in another example the air nozzles 76 may use differing nozzle geometry to provide differing air pressures/redirecting forces for a given input air pressure.

In FIG. 2B, an example system 30 using a frame 100 of multiple air jet 76 pushing mechanisms is shown. The path of the jets of air produced by the air jets 76 is shown generally at 45, illustrating how they may be selective activated to provide for a specific direction of force for pushing target items 34 into a target bin 42. One or more chute guards 110 may also be provided and attached to a side or portion of the conveyor device 32, to help direct targeted items 34 into their respective bin 42—which thereby makes the pushing mechanisms 44 robust to any randomness in object/item/material 34 motion or inaccuracy in the pushing mechanism 44 moment of contact with the item/material 34.

In another example of a pushing mechanism 44 as shown in FIG. 3, the pushing mechanism 44 may use a retractable arm or paddle member 80 coupled with a controllable pneumatic cylinder or linear actuator 82, which when enabled by the input controller 70, extends outwardly from the pushing mechanism 44 and above the surface of the conveyor device 32, and physically contacts a target item 34 to divert the item 34. The pneumatic cylinder or linear actuator 82 may be selectively activated/moved using an energy source 72 such as but not limited to an electric motor or a compressed air source, in one example. An example pushing mechanism 44 having a retracted paddle member 80 is illustrated at 310 while an example pushing mechanism 44 having an extended paddle member 80 is illustrated at 320. In another example of a pushing mechanism 44, a pneumatic arm/cylinder or linear actuator 82 may be used in combination with one or more air jets/nozzles 76 attached to the arm/paddle 80, to provide both mechanical pushing of the target item 34 combined with redirecting air forces.

In one example of operations of sorting system 30, the processor 54 receives images (for example, a stream of image frames) from an imaging sensor 52 that is viewing items/materials 34 on conveyor belt 32. If a target item 34 of material is determined by the processor 54 to be present and the pusher device 36 is to be activated, the processor 54 sends the actuation signal 62 through the I/O interface 60 to the controller 70, which controls the application of energy source 72 to a pushing mechanism 44. For instance, the controller 70 may activate a solenoid/valve device that controls delivery of compressed air 72 going to a pushing mechanism 44 (i.e., air jet nozzles 76 in one example; pneumatic cylinders 82 in another example). When activated, the pushing mechanism 44 transfers the energy to the target item/material 34 in order that it is displaced or diverted from the conveyor device 32, for instance, to the side 38 of the conveyor device 32 into a desired collection/sortation bin 42.

The pusher devices 36/pushing mechanisms 44 can be arranged in various manners depending on the particular needs of a recycling center. In the Figures of this disclosure, a "pusher" represents a pushing mechanism 44 of a pusher device 36.

Figure 4:
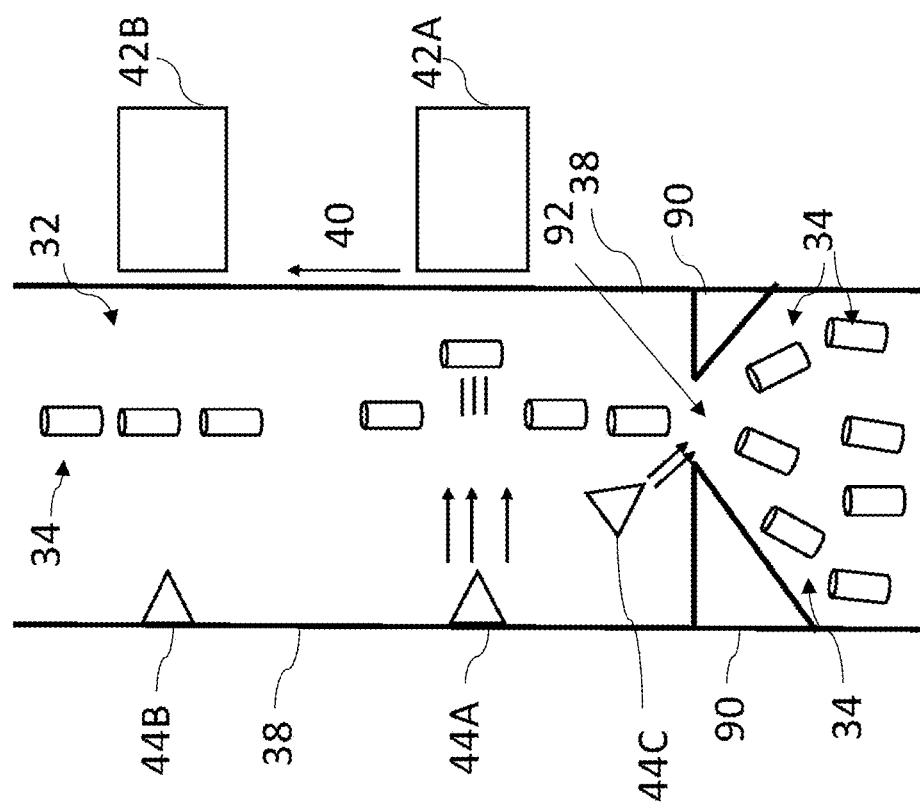
FIG. 4 is a block diagram illustrating one example configuration for a sorting system of one embodiment of the present disclosure.

Referring to FIG. 4, an overhead view of one example configuration for system 30 having a pushing mechanism 44 on a conveyor device 32 is shown, in accordance with one embodiment of the present disclosure. In this example, two pushing mechanisms 44 are positioned in series along the same side 38 of the conveyor device 32—so that each pushing mechanism 44 is diverting target items 34 towards the opposite side of the conveyor into one or more bins 42. In this example, the first pushing mechanism 44A is configured to push target items 34 into a first bin 42A; and the second pushing mechanism 44B is configured to push target items 34 into a second bin 42B. In one example, both pusher devices can be configured to direct target items 34 in a direction that is generally perpendicular to the direction of travel 40 of the conveyor device 32. Other configurations or combinations of pushing mechanism 44/pusher devices 36 may be used with a conveyor device 32, for example as described herein.

In some embodiments, singulation regulators such as shown at 90 may be used to regulate the entry of items 34 on conveyor device 32. While use of regulators 90 is optional, when used it may occur that the material/items 34 become obstructed at the regulator 90 outlet and such items 34 may jam, preventing the free flow of materials 34 along the conveyor device 32. In this case, an anti-jamming pusher device (shown as 44C in FIG. 4) may be placed with its diversion path towards the regulator 90 outlet. In one example, when a jam is detected, the anti-jamming pusher device 44C is activated and pushes the jammed materials 34 in the opposite direction of conveyor travel 40. Upon activation of the anti-jamming pusher device 44C, it displaces the jammed material 34 and allows it to once again flow freely through the regulator 90. This process may be repeated several times to clear significant jams. It is understood that the regulators 90 and anti-jamming pusher devices 44C can be used with conveyors 32 in configurations other than that of the example of FIG. 4.

Figure 5:
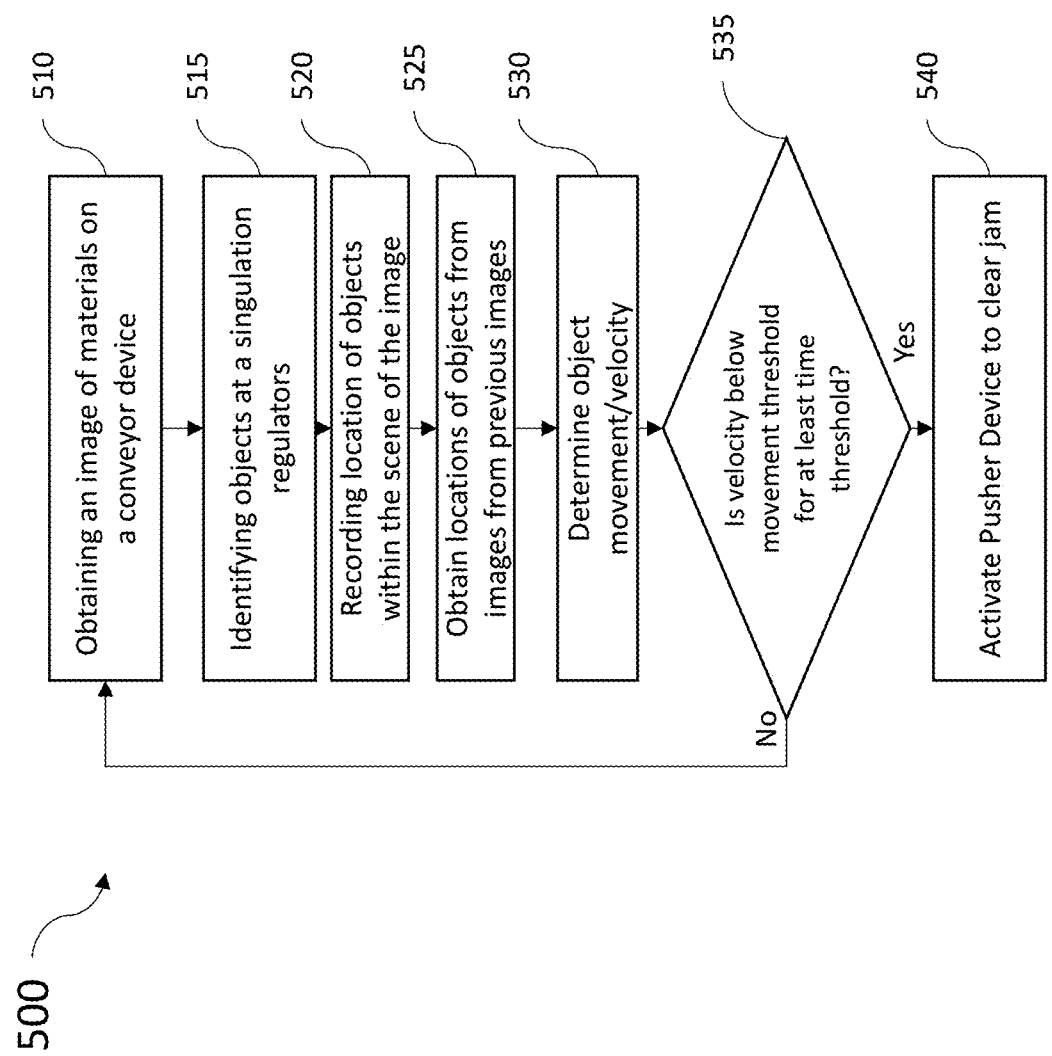
FIG. 5 is a flow chart that illustrates an example of a method of one embodiment of the present disclosure.

FIG. 5 is a flow chart that illustrates an example of a method 500 for determining the presence of a jam or blockage of materials 34. In one embodiment, this method 500 may be used in conjunction with pusher devices 36 for instance as configured in FIG. 3 where a pushing mechanism 44C is used at an opening 92 from angled singulation regulators 90 upstream on a conveyor device 32. It should be understood that the features and elements described herein with respect to method 500 may be used in conjunction with, in combination with, or substituted for elements of the sorting system 30 introduced in FIG. 1, as well as any of the other embodiments discussed herein, and vice versa. Further, it should be understood that the functions, structures and other description of elements for embodiments described herein may apply to like named or described elements for any of the Figures and vice versa.

In FIG. 5, the method begins at 510 where an image of the materials on a conveyor near the angled singulation guards is obtained, and proceeds to 515 where the objects at the singulation regulators 90 are identified, for instance through the use of a neural network 55 as described herein, or by other identification techniques. At operation 520 the location of objects within the scene of the image are recorded at each moment in time. At operation 525, these locations over images from previous times are obtained and at 530 their object movement/velocity may be determined. At operation 535, in one example, the velocity of materials in the singulation regulator vicinity is examined, and a jam is detected if the velocity has remained at or near zero for an extended period of time for a significant portion of the objects. If zero velocity occurs for a period of time over a threshold, at operation 540 the pusher device 36 or pushing mechanism 44 that is located near the singulation regulators 90 may be activated in order to clear the jam/blockage. The controller 50 and/or item identification module 64 may utilize various different techniques to identify recyclable items/objects/materials 34 and discriminate between such items so that target items present on a conveyor device 32 can be selectively diverted by the system into respective collection/sortation bins 42. It should be understood that in other embodiments, the presence of a jam or blockage of materials 34 may be detected using other techniques. For example, a pressure sensor on a wall or surface of a singleton regulator 90 may detect an increase in pressure to do material buildup to trigger activation of the pusher device 36 or pushing mechanism 44. Alternatively, a light beam (such as, but not limited to a laser light beam) may be projected across a portion of the conveyor and reception of the beam detected by a detector. If the beam remains interrupted by an object for a certain period of time, that information may be used as an indication of a blockage to trigger activation of the pusher device 36 or pushing mechanism 44. Conversely, in some implementations, if the beam remains un-interrupted by the movement of any object for a certain period of time, that information may also be used as an indication of a blockage to trigger activation of the pusher device 36 or pushing mechanism 44.

Figure 6:
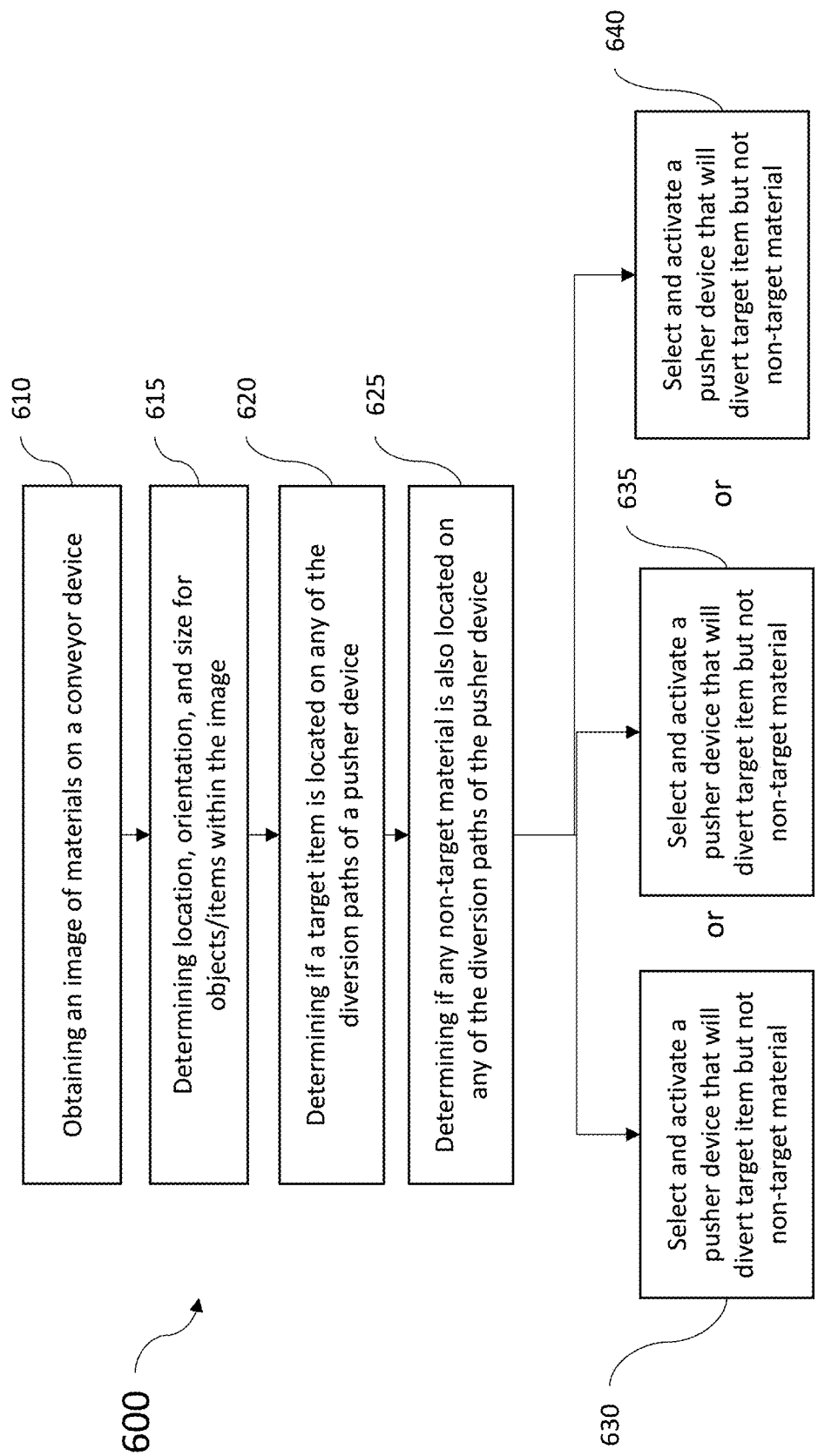
FIG. 6 is a flow chart that illustrates another example of a method of one embodiment of the present disclosure.

FIG. 6 is a flow chart illustrating a method 600 which may be implemented to choose which pusher device 36 or pushing mechanism 44 to activate to divert a target item 34, in accordance with one embodiment of the present disclosure. This method 600 may be particularly useful when there are multiple pusher devices 36 or pushing mechanisms 44 installed in a system 30, and when one or more target materials 34 are to be re-directed/displaced off of the conveyor device 32 (for instance, into desired bins 42) by the pusher devices 44 without capturing non-target materials. It should be understood that the features and elements described herein with respect to method 600 may be used in conjunction with, in combination with, or substituted for elements of the sorting system 30 introduced in FIG. 1, as well as any of the other embodiments discussed herein, and vice versa. Further, it should be understood that the functions, structures and other description of elements for embodiments described herein may apply to like named or described elements for any of the Figures and vice versa.

Method 600 begins at 610 where an image is captured by a camera (or other imaging sensor 52), and proceeds to operation 615 where a neural network inference program or other item identification process (executed on a computational processor such as processor 54) determines location, orientation, and size for objects/items within the image. Other data regarding each item in the image may also be determined, such as the expected or relative weight of an item (i.e. heavy glass bottle, lightweight small milk jug).

The method 600 proceeds to operation 620 within determining when a target item is located on any of the diversion paths of a pusher device or pushing mechanism installed on the conveyor device 32. From the collection of pusher devices that can successfully divert a target material, operation 625 determines if any of these paths also intersect non-target materials. In some embodiments, the method 600 may operate to divert target items from the conveyor device when this can be accomplished without also diverting the non-target material. In this case, the method may proceed to 630 where a pusher device that has a diversion path clear of the non-target material is selected and activated in order to divert the target item while allowing the non-target material to proceed down the conveyor device. In other embodiments, the method 600 may operate to divert non-target material from the conveyor device, even if doing so results in target materials also being diverted from the conveyor device. In that case, the method may proceed to 635 where a pusher device that has a diversion path that intersects both the target item and the non-target material is selected and activated in order to divert both the target item and non-target material from the conveyor device. In still another embodiment, the method 600 may determine if at least one diversion path intersects only the non-target material. In that case, the method may proceed to 640 where a pusher device that has a diversion path that intersects only the non-target material and not the target item is selected and activated in order to divert the non-target material from the conveyor device. Operations 620 and 625 may occur in the opposite order as well if desired.

As an example implementation of method 600, in one embodiment in operation, system 30 determines if a target object 34 is on a diversion path of a pusher device 36/pushing mechanism 44 by examining the object's shape and location, and comparing that to the diversion path of the pusher device 36/pushing mechanism 44. If the diversion path of the pusher device 36/pushing mechanism 44 intersects the object 34, then it is known that the activation of the pusher device 36/pushing mechanism 44 would divert that object 34. If multiple pusher devices 36/pushing mechanisms 44 are installed on a conveyor device 32, it is possible to determine an optimal choice of a pusher device 36/pushing mechanism 44 by examining the intersection of each pusher's path and the objects 34 that are present. If multiple pusher devices 36/pushing mechanisms 44 intersect the object 34, then a pusher device 36/pushing mechanism 44 that intersects only the target object 34 and no other objects may be chosen.

As noted above, system 30 may alternately operate to divert/capture non-target materials while allowing target materials to pass to the end of the conveyor device 32 without diversion. In this case, the operations of FIG. 6 and other portions of the present disclosure may be modified so that pusher devices 36/pushing mechanisms 44 are diverting non-targeted materials off to the sides 38 of the conveyor device 32, and that targeted materials are allowed to pass along the conveyor device 32 without being re-directed (for instance, so that these targeted materials can be collected at the end of the conveyor device 32).

Figure 7:
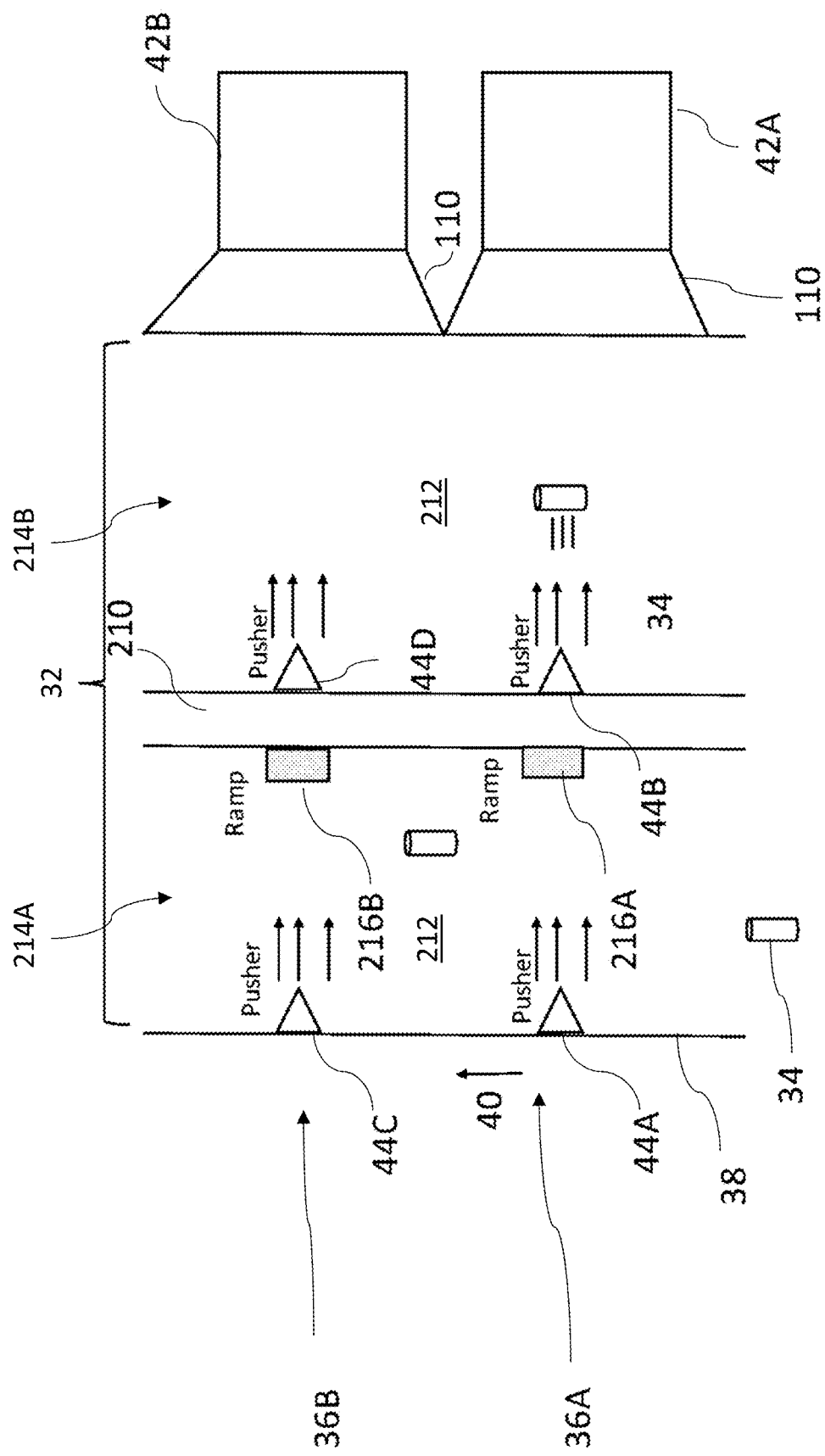
FIGS. 7 and 8 are block diagrams illustrating an example configuration for a sorting system of one embodiment of the present disclosure.
Figure 8:
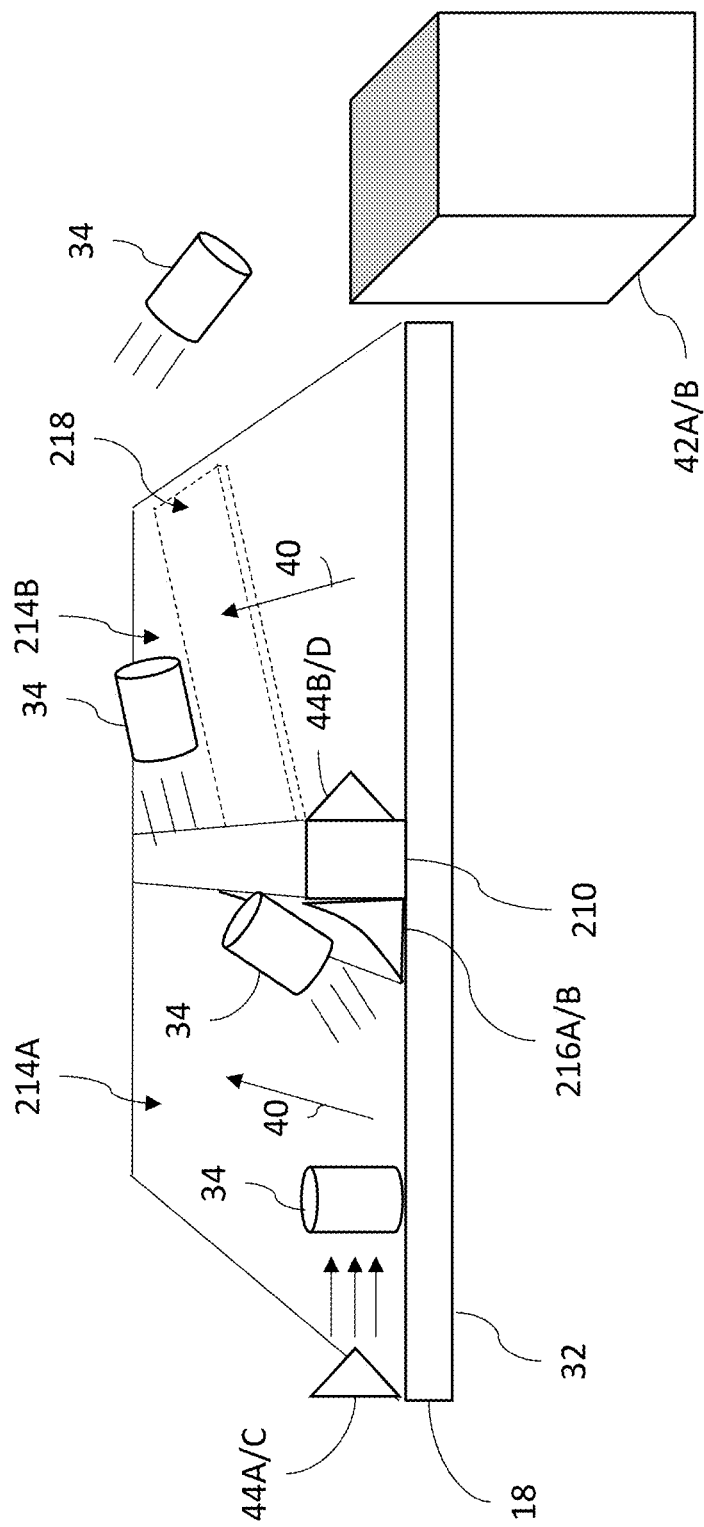

In another example embodiment as illustrated in FIGS. 7 and 8, pushing mechanisms 44A, 44B, 44C and 44D are positioned about a central portion 210 of a surface 212 of a conveyor device 32 as well as along a side 38 of the conveyor device 32, in order to define multiple lanes 214A, 214B on the surface 212 of a conveyor device 32. In this example, a first pusher device 36A comprises two air jet pushing mechanisms 44A and 44B, and a second pusher device 36B comprises two air jet pushing mechanisms 44C and 44D. Activation of the pusher devices 36A and 36B pushes items 34 into designated collection bins 42A and 42B from the two lanes 214A and 214B. Utilizing a conveyor device 32 that includes two lanes 214A and 214B can be beneficial because this configuration provides for distributing the items 34 received over the two lanes and the resulting less material per lane allows the overall system 30 to handle more material while minimizing the possibility of a pusher device 36/pushing mechanism 44 inadvertently diverting non-target materials when activated.

In FIG. 7, the first pusher device 36A has a first pair of pushing mechanisms 44A and 44B that are configured to divert a desired first type of target item 34. In this example, the first pushing mechanism 44A is positioned on the side 38 of the conveyor device 32 and the second pushing mechanism 44B is positioned about a central portion 210 of the surface 212 of the conveyor device 32. Each of these pushing mechanisms 44A and 44B are positioned/directed to divert the target items 34 into a first collection/sortation bin 42A.

The second pusher device 36B includes a second pair of pushing mechanisms 44C and 44D that, in this example, are provided downstream of the pushing mechanisms 44A and 44B of the first pusher device 36A. The second pair of pushing mechanisms 44C and 44D may be configured to divert another type of target item 34. In this example, the pushing mechanisms 44C is positioned on the side 38 of the conveyor device 32 and the other pushing mechanism 44D is positioned about a central portion 210 of the surface 212 of the conveyor device 32. Each of these pushing mechanisms 44C and 44D of this second pair is directed to divert the respective target items 34 into a second collection/sortation bin 42B.

As shown in FIGS. 7 and 8, a curved or angled ramp (such as shown at 216A and 216B) may be provided and positioned on the conveyor device 32 opposite of a respective pushing mechanism 44A and 44C in lane 214A, so that the ramps 216A and 216B each upwardly deflect materials/items 34 that are diverted by their respective pushing mechanisms 44A and 44C to move above and over the other conveyor lane 214B and into a respective associated collection bin 42A or 42B. Furthermore, as shown in FIG. 8, a covering 218 may be provided over the adjacent lane 214B, in order to prevent diverted material 34 launched from lane 214A from falling into the adjacent lane 214B (i.e. short of reading the respective intended collection bin 42A or 42B. As shown in FIG. 7, sortation guards 110 (such as also shown in FIG. 2B) may be used about a collection/sortation bins 42A and 42B, to assist the diverted target materials 34 to reach and be collected by the desired bin 42A or 42B.

Figure 9:
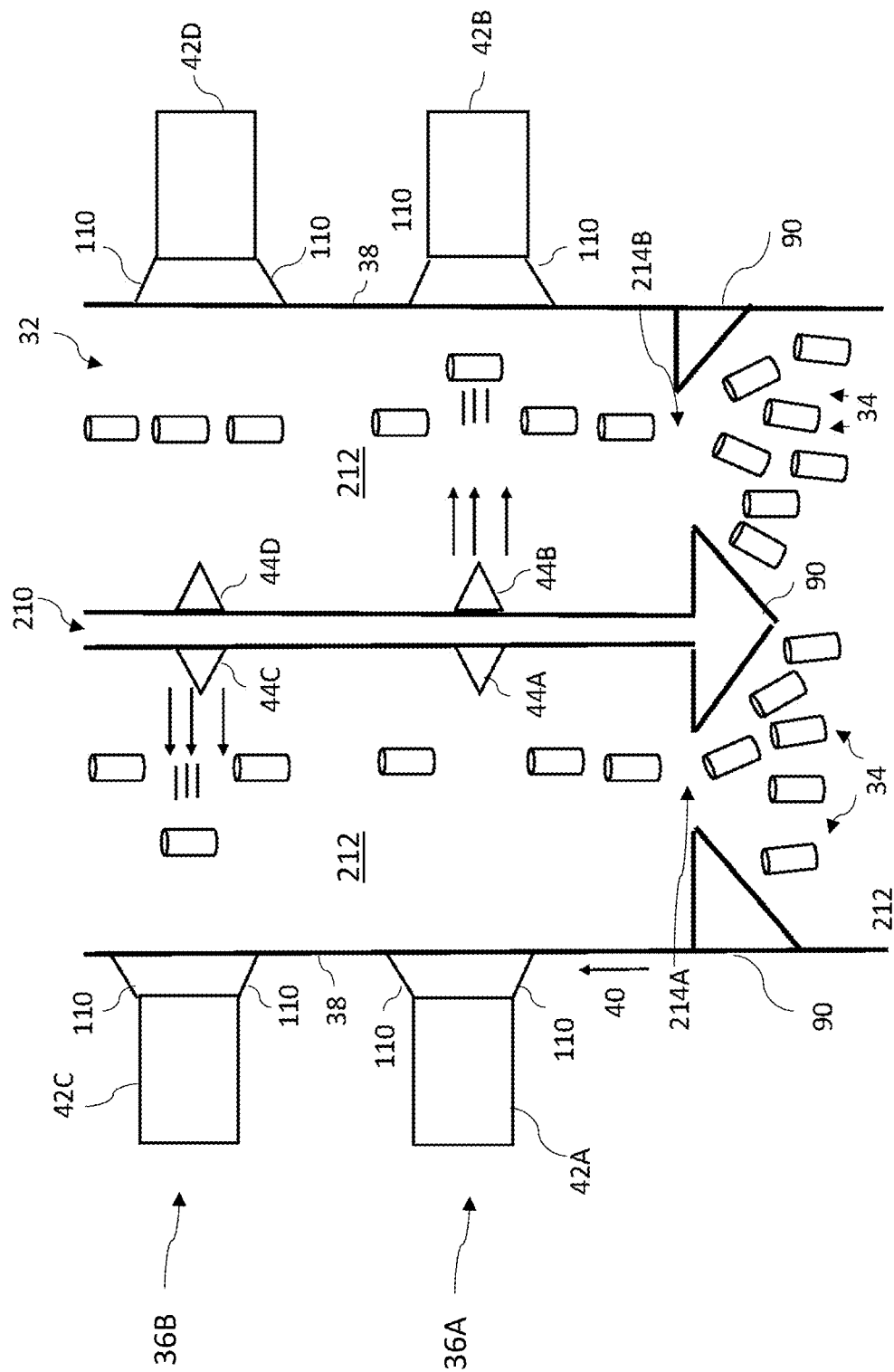
FIG. 9 is a block diagrams illustrating an example configuration for a sorting system of one embodiment of the present disclosure.

FIG. 9 illustrates another arrangement of pusher devices 36A and 36B and respective pushing mechanisms 44A, 44B, 44C, and 44D in accordance with another embodiment of the present disclosure. In this example, two lanes 214A and 214B or a conveyor device 32 are formed by angled singulation regulators 90 on the surface 212 of the conveyor device 32, and pushing mechanisms 44A and 44B, and 44C and 44D are positioned along a central portion 210 of the surface 212 of the conveyor device 32 to divert materials 34 sideways towards the sides 38 of the conveyor device 32.

In the example of FIG. 9, a first pair of pushing mechanism 44A and 44B are provided and may be configured to divert a first desired type of target item 34, and each pushing mechanism 44A and 44B of the pair is positioned along the central portion 210 of the surface 212 of the conveyor device 32. The two pushing mechanisms 44A and 44B for pusher device 36A is positioned in an opposing direction, so that one of the pushing mechanisms 44A diverts target materials into a collection bin 42A on one side 38 of the conveyor, and the other pushing mechanism 44B diverts target materials 34 into another collection bin 42B on the other side 38 of the conveyor device 32.

A second pair of pushing mechanisms 44C and 44D of pusher device 36B are provided in this example downstream of the first pair of pushing mechanisms 44A and 44B. The second pair of pushing mechanisms 44C and 44D may be configured to divert a second type of target item 34 into the collection bins 42C and 42D located on opposing sides 38 of the conveyor device 32. Sortation guards 110 adjacent to the collection bins 42 may also be used.

Figure 10:
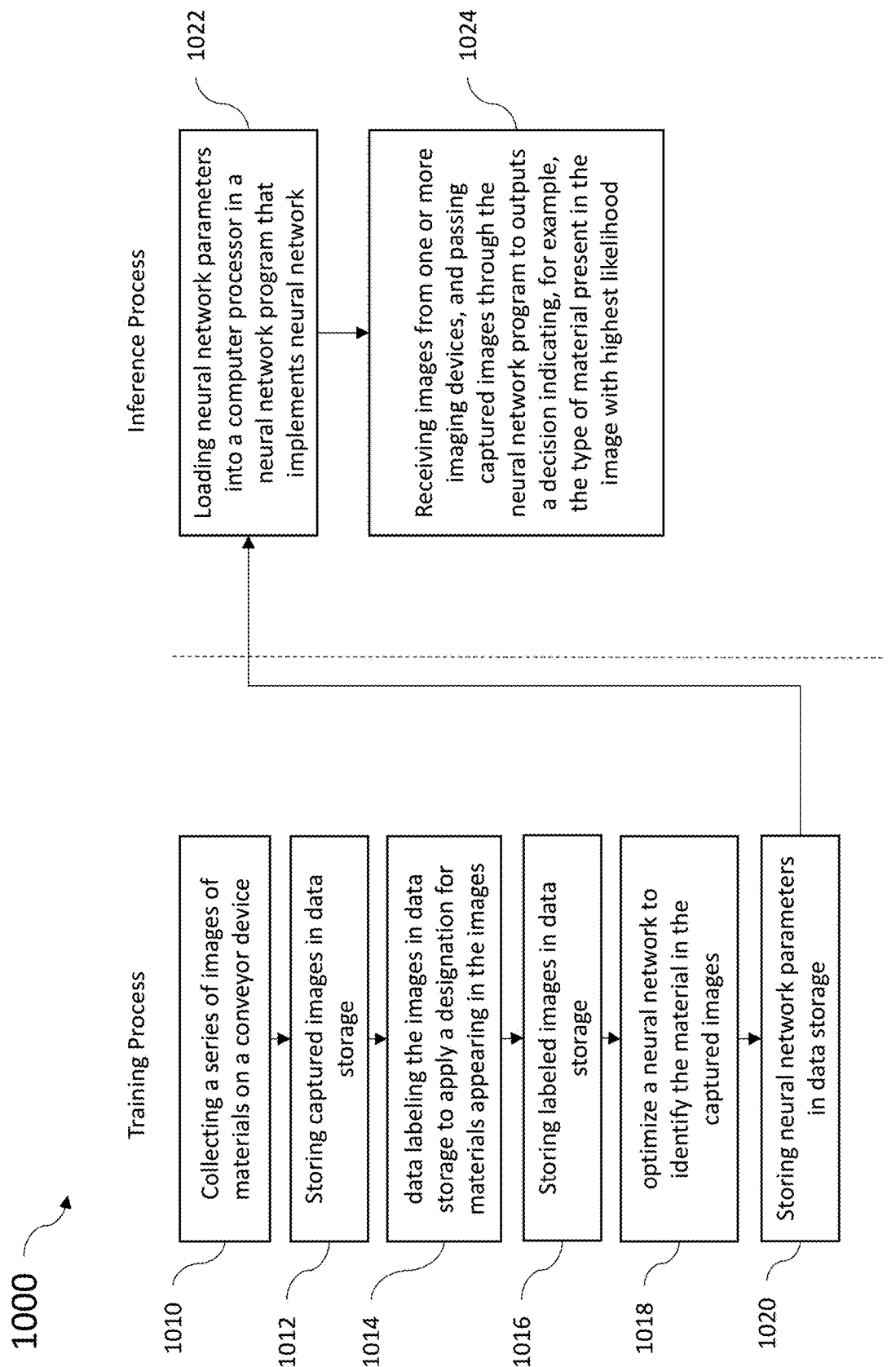
FIG. 10 is a flow chart that illustrates another example of a method of one embodiment of the present disclosure.
Figure 11:
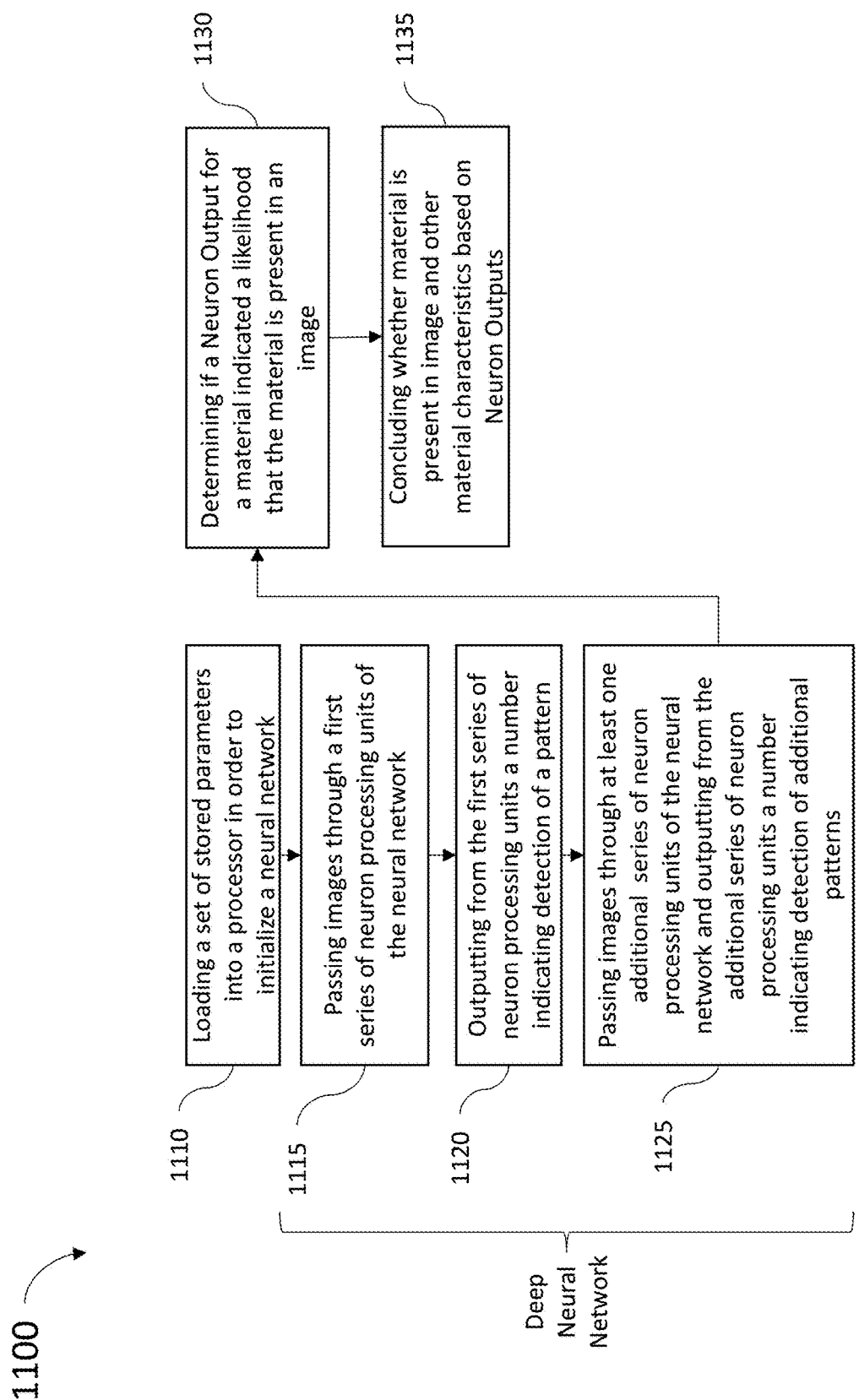
FIG. 11 is a flow chart that illustrates another example of a method of one embodiment of the present disclosure.

As previously discussed above, in some embodiments of system 30, the item identification module 64 of controller 50 may utilize a neural network 55 configure to perform neural network image recognition, which provides for a dynamically configurable sortation system that is capable of rapidly learning differing types of items 34 (such as different types of recyclable materials). FIGS. 10 and 11 illustrate various aspects relating to neural network image recognition, in accordance with one example of the present disclosure.

FIG. 10 is a block diagram illustrating a process flow for an example method 1000 to train neural network 55 to perform neural network image recognition. It should be understood that the features and elements described herein with respect to method 1000 may be used in conjunction with, in combination with, or substituted for elements of the sorting system 30 introduced in FIG. 1, as well as any of the other embodiments discussed herein, and vice versa. Further, it should be understood that the functions, structures and other description of elements for embodiments described herein may apply to like named or described elements for any of the Figures and vice versa.

The process 1000 begins at operation 1010 where a series of images (such as a stream of image frames) are collected by an imaging sensor such as, but not limited to, a camera. The process proceeds to operation 1012 where the captured images are stored in a data storage device. At operation 1014, data labeling is performed on the images so that a correct designation for materials appearing in the images are determined, and at operation 1016 the labeled images are stored in a data storage device.

At operation 1018 of process 1000, the labeled data is used by a training algorithm (which may be performed by a training processor) to optimize a neural network to identify the material in the captured images with the greatest feasible accuracy. As would be readily appreciate by one of ordinary skill in the art who has reviewed this disclosure, a number of algorithms may be utilized to perform this optimization at 1018, such as Stochastic Gradient Descent, Nesterov's Accelerated Gradient Method, or other well-known methods. In Stochastic Gradient Descent, a random collection of the labeled images is fed through the network. The error of the output neurons is used to construct an error gradient for all the neuron parameters in the network. The parameters are then adjusted using this gradient, by subtracting the gradient multiplied by a small constant called the "learning rate". These new parameters may then be used for the next step of Stochastic Gradient Descent, and the process repeated.

The result of the optimization includes a set of neural network parameters (i.e. such as those that are stored in memory 56) that allow a neural network (such as neural network 55) to determine the presence of an object in an image. At operation 1020, the neural network parameters may be stored on digital media. In one example implementation, the training process at operations 1010 to 1018 may be performed by creating a collection of images of materials 34, with each image labeled with the category of the materials 34 appearing in the image. Each of the categories can be associated with a number, for instance the conveyor belt might be 0, a carton 1, a milk jug 2, etc. The neural network 55 would then comprise a series of output neurons, with each neuron associated with one of the categories. Thus, neuron 0 is the neuron representing the presence of conveyor belt, neuron 1 represents the presence of a carton, neuron 2 represents the presence of a milk jug, and so forth for other categories.

For the neural network 55 to be used for identification of items/materials 34 learned during training operations 1010-1018, the method proceeds with an inference process where at operation 1022 the neural network parameters are loaded into a computer processor (such as the processor 54) in a neural network program that implements neural network 55. At operation 1024, the processor 54 may then receive images from one or more imaging sensors 52, and pass that image through the neural network program. The neural network 55 then outputs a decision, indicating, for example, the type of material present in the image with highest likelihood.

An example of the inference process is described herein with reference to FIG. 11 where an example of a method 1100 is illustrated for detecting and identifying recyclable materials, using in this example a neural network inference process such as implemented by controller 50. It should be understood that the features and elements described herein with respect to method 1100 may be used in conjunction with, in combination with, or substituted for elements of the sorting system 30 introduced in FIG. 1, as well as any of the other embodiments discussed herein, and vice versa. Further, it should be understood that the functions, structures and other description of elements for embodiments described herein may apply to like named or described elements for any of the Figures and vice versa.

Method 1100 begins at operation 1110, where a set of stored parameters is loaded into a processor in order to initialize a neural network. These parameters are identified through training of a neural network, done previously for example in FIG. 10, and may be included in the neural network parameters 58.

At operation 1115, an image is passed through a series of neuron processing units. Each processing unit has associated with it a set of parameters that have been determined previously in the training process. These neurons then output a number at operation 1120, indicating its detection of a pattern in the data. At operation 1125, this output may be fed into additional neurons, with each set of neurons doing detecting in parallel called a "layer". When there are several layers of these neurons reading as input the output of other neurons, this is known as a "Deep Neural Network" as indicated in FIG. 11.

Techniques to construct, optimize, and utilize a neural network for use as neural network 55 are known to those of ordinary skill in the art as found relevant literature. Examples of such literature include the publications: Krizhevsky et al., "Image Net Classification with Deep Convolutional Networks", Proceedings of the 25th International Conference on Neural Information Processing Systems, Dec. 3-6, 2012, Lake Tahoe, Nev., and LeCun et al., "Gradient-Based Learning Applied to Document Recognition", Proceedings of the IEEE, Institute of Electrical and Electronic Engineers (IEEE), November 1998, both of which are hereby incorporated by reference herein in their entirety, are examples of such literature.

In one example technique, an image captured by an imaging sensor 52 may processed as an array of pixel values. Each pixel may be represented by a single number, as in the case of a grayscale image, or as a series of numbers representing color values, such as red, green, and blue. These pixel values are multiplied by the neuron weight parameters, and may possibly have a bias added. This is fed into a neuron nonlinearity. The resulting number output by the neuron can be treated much as the pixel values were, with this output multiplied by subsequent neuron weight values, a bias optionally added, and once again fed into a neuron nonlinearity. Each such iteration of the process is known as a "layer" of the neural network. The final outputs of the final layer may be interpreted as probabilities that a material is present or absent in the image. Examples of such a process are described in detail in both "ImageNet Classification with Deep Convolutional Networks" and "Gradient-Based Learning Applied to Document Recognition".

In one embodiment, as a final layer, the "classification layer", the final set of neurons' output is trained to represent the likelihood a material is present in an image. At operation 1130, if the likelihood that a material/item 34 is present in an image is over a user-specified threshold, then at operation 1135 it is determined that a target item/material 34 is indeed present in the image. These techniques can be extended to determine not only the presence of a type of item/material 34 in an entire image, but also whether sub-regions of the image belong to one type of item/material 34 or another type of item/material. This process is known as segmentation, and techniques to use neural networks exist in the literature, such as those known as "fully convolutional" neural networks, or networks that otherwise comprise a convolutional portion (i.e. are partially convolutional), if not fully convolutional. This allows for material location and size to be determined.

It should be understood that the present disclosure is not exclusively limited to neural network recognition techniques. Other common techniques for material/item identification may also be used by the item identification module 64 of controller 50. For instance, the controller 50 or item identification module 64 (or other modules, components, devices or processes described herein) may utilize optical spectrometric techniques using multi- or hyper-spectral cameras to provide a signal that may indicate the presence or absence of a type of material/item 34 by examining the spectral emissions of the item/material 34. Photographs of item/material 34 may also be used in a template-matching algorithm, wherein a database of images is compared against an acquired image to find the presence or absence of certain types of items/materials 34 from that database. A histogram of the captured image may also be compared against a database of histograms. Similarly, a bag of words model may be used with a feature extraction technique, such as SIFT, to compare extracted features between a captured image and those in a database.

Accordingly, it can be seen that embodiments of the present disclosure provide for receiving and processing various types of recyclable items on a conveyor, and selectively diverting the target items (from a collection of various other types of recyclable items) to the side of the conveyor into respective collection/sortation bins.

EXAMPLE EMBODIMENTS

Example 1 includes a system for sorting objects, the system comprising: at least one imaging sensor; a controller comprising a processor and a memory storage, wherein the controller receives image data captured by the at least one image sensor; and at least one pusher device coupled to the controller, wherein the at least one pusher device is configured to receive an actuation signal from the controller; wherein the processor executes an item identification module configured to detect objects travelling on a conveyor device and recognize at least one target item traveling on a conveyor device by processing the image data and to determine an expected time when the at least one target item will be located within a diversion path of the pusher device; and wherein the controller selectively generates the actuation signal based on whether a sensed object detected in the image data comprise the at least one target item.

Example 2 includes the system of example 1, wherein the at least one pusher device comprises at least one of a mechanical pushing mechanism, a pneumatic pushing mechanism, or an air jet pushing mechanism.

Example 3 includes the system of any of examples 1-2, wherein the controller selectively actuates a first pusher device of the at least one pusher device when a first target item is located in a first diversion path of the first pusher device and no non-target material is located in the first diversion path.

Example 4 includes the system of any of examples 1-3, wherein the controller selectively actuates a first pusher device of the at least one pusher device when a first target item is located in a first diversion path of the first pusher device and at least one non-target material is located in the first diversion path.

Example 5 includes the system of any of examples 1-4, wherein the at least one pusher device is configured to remove material within the diversion path from the conveyor device in response to receiving the actuation signal.

Example 6 includes the system of any of examples 1-5, wherein the identification module comprises a neural network and the memory stores neural network parameters, wherein the neural network identifies the at least one target item traveling on a conveyor device based on object characteristics defined by the neural network parameters.

Example 7 includes the system of example 6, wherein the neural network is configured to identify recyclable items as the at least one target item based on the object characteristics defined by the neural network parameters.

Example 8 includes the system of example 6, wherein the neural network is configured to discriminate between recyclable items based on the object characteristics defined by the neural network parameters.

Example 9 includes the system of example 6, wherein the neural network comprises either a fully convolutional neural network, or a neural network comprising at least a convolutional portion.

Example 10 includes the system of any of examples 1-9, wherein the at least one imaging sensor comprises a first imaging sensors coupled to the controller by a wireless connection.

Example 11 includes the system of any of examples 1-10, wherein the at least one pusher device comprises a pusher device coupled to the controller by a wireless connection.

Example 12 includes the system of any of examples 1-11, wherein at least part of the memory storage comprises a memory storage device coupled to the processor by a network connection.

Example 13 includes the system of any of examples 1-12, wherein the identification module comprises a neural network configured to determine at least a first characteristic for a first object appearing within a first image of the image data captured by the at least one image sensor, wherein the first characteristic is at least one of location, orientation, type, weight or size.

Example 14 includes the system of example 13, wherein the actuation signal varies an amount of pushing force applied by a first pusher device as a function of the first characteristic.

Example 15 includes the system of any of examples 1-14, wherein the at least one pusher device comprises a plurality of pusher devices, wherein a first diversion path of a first pusher device intersects with a second diversion path of a second pusher device.

Example 16 includes the system of any of examples 1-15, wherein the at least one pusher device comprises a plurality of pusher devices, wherein each of the plurality of pusher devices is associated with a respective collection bin; wherein the controller determines which of the plurality of pusher devices to activate based on at least one characteristic of the at least one target item identified by the neural network.

Example 17 includes the system of any of examples 1-16, wherein each of the plurality of pusher devices is associated with a respective collection bin, wherein the controller determines which of the plurality of pusher devices to activate based on an association between the respective collection bin associated and objects comprising the at least one characteristic.

Example 18 includes the system of any of examples 1-17, wherein the controller is configured to determine when a blockage is obstructing travel of one or more objects travelling on the conveyor device.

Example 19 includes the system of any of examples 1-18, wherein the conveyor device comprises at least one singulation regulator.

Example 20 includes the system of example 19, wherein a first imaging sensor of the at least one imaging sensor is configured to view an opening of the at least one singulation regulator and determine a velocity of at least first object at the opening and determine when a blockage is occurring at the opening based on the velocity; and wherein the controller is configured to actuate a first pusher device of the plurality of pusher devices to clear the blockage when the blockage is detected.

Example 21 includes the system of any of examples 1-20, wherein the conveyor comprises multiple conveyor lines.

Example 22 includes the system of any of examples 1-21, wherein the conveyor comprises a conveyor belt.

Example 23 includes a method for sorting objects traveling on a conveyor, the method comprising: receiving image data captured by at least one image sensor for an image comprising at least one item traveling on a conveyor device; executing an item identification module on a processor, the item identification module configured to detect characteristics of the at least one item travelling on the conveyor device by processing the image data; determining an expected time when the at least one item will be located within a diversion path of at least one pusher device; and selectively generating an actuation signal to operate the at least one pusher device based on whether the at least one item comprises a target item.

Example 24 includes the method of example 23, wherein the at least one pusher device comprises at least one of a mechanical pushing mechanism, a pneumatic pushing mechanism, or an air jet pushing mechanism.

Example 25 includes the method of any of examples 23-24, further comprising selectively actuating a first pusher device of the at least one pusher device when a first target item is located in a first diversion path of the first pusher device and no non-target material is located in the first diversion path.

Example 26 includes the method of any of examples 23-25, further comprising selectively actuating a first pusher device of the at least one pusher device when a first target item is located in a first diversion path of the first pusher device and at least one non-target material is located in the first diversion path.

Example 27 includes the method of any of examples 23-26, wherein the at least one pusher device is configured to remove material within the diversion path from the conveyor device in response to receiving the actuation signal.

Example 28 includes the method of any of examples 23-27, wherein the identification module comprises a neural network, wherein the neural network identifies the at least one target item traveling on a conveyor device based on object characteristics defined by the neural network parameters stored in a memory.

Example 29 includes the method of examples 28, wherein the neural network is configured to identify recyclable items as the at least one target item based on the object characteristics defined by the neural network parameters.

Example 30 includes the method of example 28, wherein the neural network is configured to discriminate between recyclable items based on the object characteristics defined by the neural network parameters.

Example 31 includes the method of any of examples 23-30, wherein the identification module comprises a neural network configured to determine at least a first characteristic for a first object appealing within a first image of the image data captured by the at least one image sensor, wherein the first characteristic is at least one of location, orientation, type, weight or size.

Example 32 includes the method of example 31, wherein the actuation signal varies an amount of pushing force applied by a first pusher device as a function of the first characteristic.

Example 33 includes the method of example 31, wherein the at least one pusher device comprises a plurality of pusher devices; the method further comprising: determining which of the plurality of pusher devices to activate based on at least one characteristic of the at least one target item identified by the neural network.

In various alternative embodiments, system elements, method steps, or examples described throughout this disclosure (such as the controller, pusher devices, item identification module, pushing decision module, neural network, process control electronics and interfaces and/or sub-parts of any thereof, for example) may be implemented, at least in part, using one or more computer systems, field programmable gate arrays (FPGAs), or similar devices and/or comprising a processor coupled to a memory and executing code to realize those elements, processes, steps or examples, said code stored on a non-transient data storage device. Therefore other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

As used herein, terms such as "controller", "processor", "memory", "neural network", "interface", "Item Identification Module", "Pushing Decision Module", "pushing mechanism", "pusher devices", "imaging sensor", "bin" or "circuitry", each refer to non-generic device elements that would be recognized and understood by those of skill in the art and are not used herein as nonce words or nonce terms for the purpose of invoking 35 USC 112(f).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A system, comprising:
    a processor configured to:
        receive sensor data generated by a sensor;
        detect a target item and a non-target item on a conveyor device based at least in part on the sensor data;
        determine that the target item is located on a diversion path of a pusher device;
        determine whether to activate the pusher device to divert the target item off of the conveyor device based at least in part on whether the non-target item is also on the diversion path of the pusher device;
        determine whether a blockage is obstructing travel of one or more items travelling on the conveyor device; and
        in response to a determination of the blockage, activate a pushing mechanism to clear the blockage; and
    a memory coupled to the processor and configured to provide the processor with instructions.

2. The system of claim 1, wherein the pusher device comprises at least one of a mechanical pushing mechanism, a pneumatic pushing mechanism, or an air jet pushing mechanism.

3. The system of claim 1, wherein to detect the target item and the non-target item on the conveyor device is further based on a neural network configured to identify the target item based at least in part on item characteristics defined by neural network parameters.

4. The system of claim 3, wherein the neural network is configured to identify a selected item as the target item based on the item characteristics defined by the neural network parameters.

5. The system of claim 1, wherein the pusher device comprises a plurality of pusher devices, and wherein the processor is further configured to determine which of the plurality of pusher devices to activate based on at least one characteristic of the target item.

6. The system of claim 1, wherein to determine whether the blockage is obstructing travel of the one or more items travelling on the conveyor device comprises to:
    determine a velocity of a subset of the one or more items in a vicinity of a singulation regulator on the conveyor device; and
    determine that the blockage is obstructing travel of the one or more items travelling on the conveyor device based at least in part on the velocity.

7. The system of claim 1, wherein to determine whether the blockage is obstructing travel of the one or more items travelling on the conveyor device comprises to:
    determine an increase in pressure using a pressure sensor that is coupled to a singulation regulator on the conveyor device; and
    determine that the blockage is obstructing travel of the one or more items travelling on the conveyor device based at least in part on the increase in pressure.

8. The system of claim 1, wherein the pusher device comprises a plurality of pusher devices, wherein the diversion path comprises a first diversion path of a first pusher device, and wherein a second pusher device corresponds to a second diversion path that is different from the first diversion path of the first pusher device.

9. The system of claim 1, wherein the processor is configured to:
    determine to activate the pusher device to divert the target item off of the conveyor device;
    determine a first characteristic associated with the target item, wherein the first characteristic comprises at least one of location, orientation, type, weight or size; and
    use the first characteristic to determine an amount of pushing force to be applied by the pusher device onto the target item.

10. A method, comprising:
    receiving sensor data generated by a sensor;
    detecting a target item and a non-target item on a conveyor device based at least in part on the sensor data;
    determining that the target item is located on a diversion path of a pusher device;
    determining whether to activate the pusher device to divert the target item off of the conveyor device based at least in part on whether the non-target item is also on the diversion path of the pusher device;
    determining whether a blockage is obstructing travel of one or more items travelling on the conveyor device; and
    in response to a determination of the blockage, activating a pushing mechanism to clear the blockage.

11. The method of claim 10, wherein the pusher device comprises at least one of a mechanical pushing mechanism, a pneumatic pushing mechanism, or an air jet pushing mechanism.

12. The method of claim 10, wherein detecting the target item and the non-target item on the conveyor device is further based on a neural network configured to identify the target item based at least in part on item characteristics defined by neural network parameters.

13. The method of claim 12, wherein the neural network is configured to identify a selected item as the target item based on the item characteristics defined by the neural network parameters.

14. The method of claim 10, wherein the pusher device comprises a plurality of pusher devices, and further comprising determining which of the plurality of pusher devices to activate based on at least one characteristic of the target item.

15. The method of claim 6, wherein determining whether the blockage is obstructing travel of the one or more items travelling on the conveyor device comprises:
   determining a velocity of a subset of the one or more items in a vicinity of a singulation regulator on the conveyor device; and
   determining that the blockage is obstructing travel of the one or more items travelling on the conveyor device based at least in part on the velocity.

16. The method of claim 6, wherein determining whether the blockage is obstructing travel of the one or more items travelling on the conveyor device comprises:
   determining an increase in pressure using a pressure sensor that is coupled to a singulation regulator on the conveyor device; and
   determining that the blockage is obstructing travel of the one or more items travelling on the conveyor device based at least in part on the increase in pressure.

17. The method of claim 10, wherein the pusher device comprises a plurality of pusher devices, wherein the diversion path comprises a first diversion path of a first pusher device, and wherein a second pusher device corresponds to a second diversion path that is different from the first diversion path of the first pusher device.

18. The method of claim 10, further comprising:
   determining to activate the pusher device to divert the target item off of the conveyor device;
   determining a first characteristic associated with the target item, wherein the first characteristic comprises at least one of location, orientation, type, weight or size; and
   using the first characteristic to determine an amount of pushing force to be applied by the pusher device onto the target item.

19. A system, comprising:
   a processor configured to:
      receive sensor data generated by a sensor;
      detect a target item and a non-target item on a conveyor device based at least in part on the sensor data;
      determine that the target item is located on a diversion path of a pusher device;
      determine whether to activate the pusher device to divert the target item off of the conveyor device based at least in part on whether the non-target item is also on the diversion path of the pusher device; and
      determine whether a blockage is obstructing travel of one or more items travelling on the conveyor device, including to:
         determine an increase in pressure using a pressure sensor that is coupled to a singulation regulator on the conveyor device; and
         determine that the blockage is obstructing travel of the one or more items travelling on the conveyor device based at least in part on the increase in pressure; and
   a memory coupled to the processor and configured to provide the processor with instructions.

20. A system, comprising:
   a processor configured to:
      receive sensor data generated by a sensor;
      detect a target item and a non-target item on a conveyor device based at least in part on the sensor data;
      determine that the target item is located on a diversion path of a pusher device;
      determine whether to activate the pusher device to divert the target item off of the conveyor device based at least in part on whether the non-target item is also on the diversion path of the pusher device;
      determine to activate the pusher device to divert the target item off of the conveyor device;
      determine a first characteristic associated with the target item, wherein the first characteristic comprises at least one of location, orientation, type, weight or size; and
      use the first characteristic to determine an amount of pushing force to be applied by the pusher device onto the target item; and
   a memory coupled to the processor and configured to provide the processor with instructions.

21. A method, comprising:
   receiving sensor data generated by a sensor;
   detecting a target item and a non-target item on a conveyor device based at least in part on the sensor data;
   determining that the target item is located on a diversion path of a pusher device;
   determining whether to activate the pusher device to divert the target item off of the conveyor device based at least in part on whether the non-target item is also on the diversion path of the pusher device; and
   determining whether a blockage is obstructing travel of one or more items travelling on the conveyor device, including:
      determining an increase in pressure using a pressure sensor that is coupled to a singulation regulator on the conveyor device; and
      determining that the blockage is obstructing travel of the one or more items travelling on the conveyor device based at least in part on the increase in pressure.

22. A method, comprising:
   receiving sensor data generated by a sensor;
   detecting a target item and a non-target item on a conveyor device based at least in part on the sensor data;
   determining that the target item is located on a diversion path of a pusher device;
   determining whether to activate the pusher device to divert the target item off of the conveyor device based at least in part on whether the non-target item is also on the diversion path of the pusher device;
   determining to activate the pusher device to divert the target item off of the conveyor device;
   determining a first characteristic associated with the target item, wherein the first characteristic comprises at least one of location, orientation, type, weight or size; and
   using the first characteristic to determine an amount of pushing force to be applied by the pusher device onto the target item.

* * * * *

UNITED STATES PATENT AND TRADEMARK OFFICE
CERTIFICATE OF CORRECTION

PATENT NO. : 11,389,834 B2
APPLICATION NO. : 17/062383
DATED : July 19, 2022
INVENTOR(S) : Matanya B. Horowitz, James A. Bailey and John C. McCoy, Jr.

It is certified that error appears in the above-identified patent and that said Letters Patent is hereby corrected as shown below:

In the Specification

In Column 7, Line 66, delete "i- row" and insert --multi-row--, therefor.

In the Claims

In Column 21, Line 10, Claim 15, delete "6" and insert --10--, therefor.
In Column 21, Line 19, Claim 16, delete "6" and insert --10--, therefor.

Signed and Sealed this
Twenty-first Day of February, 2023

Katherine Kelly Vidal
*Director of the United States Patent and Trademark Office*